(12) United States Patent
Zhang

(10) Patent No.: US 12,405,113 B2
(45) Date of Patent: *Sep. 2, 2025

(54) SYSTEM AND METHOD FOR AUTO-RETURN

(71) Applicant: SZ DJI TECHNOLOGY CO., LTD., Shenzhen (CN)

(72) Inventor: Honghui Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,956

(22) Filed: Dec. 28, 2023

(65) Prior Publication Data

US 2024/0410697 A1 Dec. 12, 2024

Related U.S. Application Data

(63) Continuation of application No. 17/718,301, filed on Apr. 11, 2022, now Pat. No. 11,879,737, which is a
(Continued)

(51) Int. Cl.
*G01C 21/20* (2006.01)
*G01C 21/00* (2006.01)
(Continued)

(52) U.S. Cl.
CPC ........... *G01C 21/20* (2013.01); *G01C 21/005* (2013.01); *G01C 21/3852* (2020.08);
(Continued)

(58) Field of Classification Search
CPC .. G01C 21/20; G01C 21/3852; G01C 21/005; G06T 7/246; G05D 1/106; G05D 1/46; G05D 1/43; G05D 1/101; G01S 19/14
See application file for complete search history.

(56) References Cited

U.S. PATENT DOCUMENTS 7,725,257 B2 5/2010 Strelow et al.
7,912,633 B1 3/2011 Dietsch et al.
(Continued)

FOREIGN PATENT DOCUMENTS

CN 101000243 A 7/2007
CN 101114337 A 1/2008
(Continued)

OTHER PUBLICATIONS

The World Intellectual Property Organization (WIPO) International Search Report and Written Opinion for PCT/CN2015/096746 Aug. 29, 2016 9 Pages.
(Continued)

*Primary Examiner* — Gertrude Arthur Jeanglaude
(74) *Attorney, Agent, or Firm* — ANOVA LAW GROUP, PLLC

(57) ABSTRACT

An apparatus of controlling flight of an aerial vehicle includes a memory storing a computer program code, and one or more processors, individually or collectively, configured to execute the computer program code to: collect, while the aerial vehicle traverses a flight path, a set of images corresponding to different fields of view of an environment around the aerial vehicle, construct a map of the environment using the set of images, and control the aerial vehicle to return along a return path using the map of the environment.

20 Claims, 12 Drawing Sheets

Related U.S. Application Data continuation of application No. 16/885,841, filed on May 28, 2020, now Pat. No. 11,300,413, which is a continuation of application No. 16/001,926, filed on Jun. 6, 2018, now Pat. No. 10,670,407, which is a continuation of application No. PCT/CN2015/096746, filed on Dec. 9, 2015.

(51) Int. Cl.
| | | |
|---|---|---|
| *G01S 19/14* | (2010.01) | |
| *G05D 1/00* | (2006.01) | |
| *G05D 1/43* | (2024.01) | |
| *G05D 1/46* | (2024.01) | |
| *G06T 7/246* | (2017.01) | |

(52) U.S. Cl.
CPC .............. *G01S 19/14* (2013.01); *G05D 1/101* (2013.01); *G05D 1/106* (2019.05); *G05D 1/43* (2024.01); *G05D 1/46* (2024.01); *G06T 7/246* (2017.01)

(56) References Cited

U.S. PATENT DOCUMENTS

| | | | |
|---|---|---|---|
| 8,467,902 B2 | 6/2013 | Myeong et al. | |
| 8,666,661 B2 | 3/2014 | Higgins | |
| 9,007,461 B2 | 4/2015 | Ohtomo et al. | |
| 9,046,759 B1 | 6/2015 | Tarlinton et al. | |
| 9,051,043 B1 | 6/2015 | Peeters et al. | |
| 9,075,415 B2* | 7/2015 | Kugelmass | B64U 50/19 |
| 9,508,263 B1* | 11/2016 | Teng | G05D 1/0094 |
| 10,162,353 B2* | 12/2018 | Hammond | G01S 7/4813 |
| 11,300,413 B2 | 4/2022 | Zhang | |
| 11,879,737 B2* | 1/2024 | Zhang | G01C 21/3852 |

| | | | |
|---|---|---|---|
| 2003/0152892 A1 | 8/2003 | Huang et al. | |
| 2009/0125223 A1 | 5/2009 | Higgins | |
| 2009/0285450 A1 | 11/2009 | Kaiser et al. | |
| 2014/0207365 A1 | 7/2014 | Pereira | |
| 2015/0260526 A1 | 9/2015 | Paduano et al. | |
| 2015/0298799 A1 | 10/2015 | Bertrand et al. | |

FOREIGN PATENT DOCUMENTS

| | | |
|---|---|---|
| CN | 101650891 A | 2/2010 |
| CN | 102201115 A | 9/2011 |
| CN | 103822635 A | 5/2014 |
| CN | 103916632 A | 7/2014 |
| CN | 103941746 A | 7/2014 |
| CN | 103941748 A | 7/2014 |
| CN | 104102218 A | 10/2014 |
| CN | 104516354 A | 4/2015 |
| CN | 104781781 A | 7/2015 |
| CN | 104807456 A | 7/2015 |
| CN | 104932515 A | 9/2015 |
| CN | 105068553 A | 11/2015 |
| JP | 2012140101 A | 7/2012 |
| JP | 2014051213 A | 3/2014 |
| JP | 2014139538 A | 7/2014 |
| JP | 2015048025 A | 3/2015 |
| JP | 2015201183 A | 11/2015 |
| JP | 2015210677 A | 11/2015 |
| WO | 2015143615 A1 | 10/2015 |

OTHER PUBLICATIONS

Friedrich Fraundorfer et al. "Vision-based autonomous mapping and exploration using a quadrotor MAV", 2012 IEEE/RSJ International Conference On Intelligent Robots And Systems, Oct. 1, 2012 (Oct. 1, 2012), pp. 4557-4564.

* cited by examiner

SYSTEM AND METHOD FOR AUTO-RETURN

CROSS-REFERENCE TO RELATED APPLICATIONS

This application is a continuation of application Ser. No. 17/718,301, filed on Apr. 11, 2022, now U.S. Pat. No. 11,879,737, which a continuation of application Ser. No. 16/885,841, filed on May 28, 2020, now U.S. Pat. No. 11,300,413, issued on Apr. 12, 2022, which is a continuation of application Ser. No. 16/001,926, filed on Jun. 6, 2018, now U.S. Pat. No. 10,670,407, which is a continuation of International Application No. PCT/CN2015/096746, filed on Dec. 9, 2015, the entire contents of all of which are incorporated herein by reference.

BACKGROUND OF THE DISCLOSURE

Traditionally, aerial photography utilizes a single camera which causes images sampled at locations where the vehicle has traveled to be segmented. For example, an aerial vehicle may fly towards the north with a forward-facing camera, and may result in recording images on the northern side. When the vehicle turns around and returns southward, the forward-facing camera may be pointing southward, and may only record images on the southern side. The differences in these images may prevent the vehicle from auto-returning using visual cognition.

SUMMARY OF THE DISCLOSURE

A need exists for improved systems and methods for auto-returning, which may reply on visual cognition. Multiple cameras may be supported on an aerial vehicle to aid in collecting image data that can be used for auto-return. The multiple cameras may face in different directions to have different fields of view, to allow a wide scope of coverage so that regardless of orientation of the UAV, the UAV may use the image data to determine how to return along its original path.

Processing and memory storage for images from multiple cameras, which are being collected and assessed while the UAV is traveling may become demanding. In order to reduce some burden on the system, selected features from selected images may be stored and/or used to aid in navigation. In some instances, the features may be feature points, which may be used to guide the auto-return. The features may be selected based on their presence or absence in multiple cameras. The intervals for storing features may be selected based on various parameters.

An aspect of the disclosure is directed to a method of controlling flight of an unmanned aerial vehicle (UAV), the method comprising: collecting a first set of images corresponding to different fields of view of an environment around the UAV using multiple image capture devices, each of the multiple image capture devices having the different fields of view while traversing a flight path; extracting a first set of feature points from the first set of images while traversing the flight path; collecting a second set of images corresponding to different fields of view using the multiple image capture devices while traversing a return path; and traversing the return path by comparing the first set of feature points extracted during the flight path with a second set of feature points extracted from the second set of images.

Additionally, aspects of the disclosure are directed to an apparatus for controlling flight of an unmanned aerial vehicle (UAV), the apparatus comprising: multiple image capture devices, each having different fields of view, configured to: (1) collect a first set of images corresponding to the different fields of view of an environment around the UAV while traversing a flight path, and (2) collect a second set of images corresponding to the different fields of view while traversing a return path; and one or more processors, individually or collectively configured to: (1) extract a first set of feature points from the first set of images while traversing the flight path, and (2) generate a signal that causes the UAV to traverse the return path by comparing the first set of feature points extracted during the flight path with a second set of feature points extracted from the second set of images.

A method of controlling flight of an unmanned aerial vehicle (UAV) is provided in accordance with further aspects of the disclosure. The method may comprise: collecting a set of images while traversing a flight path; extracting a set of feature points from the set of images while traversing the flight path; and selecting a subset of the feature points from the set of feature points to be stored for navigational aid, based on (1) movement of the UAV, (2) degree of overlap between images within the set of images, (3) degree of overlap between feature points within the set of feature points, or (4) a determination whether the feature points are stationary.

Moreover, aspects of the disclosure may include an apparatus for controlling flight of an unmanned aerial vehicle (UAV), the apparatus comprising: one or more processors, individually or collectively configured to: receive a set of images collected by the UAV while traversing the flight path; extract a set of feature points from the set of images while traversing the flight path; and select a subset of the feature points from the set of feature points to be stored for navigational aid, based on (1) movement of the UAV, (2) degree of overlap between images within the set of images, (3) degree of overlap between feature points within the set of feature points, or (4) a determination whether the feature points are stationary.

Another aspect of the disclosure is directed to a method of controlling flight of an unmanned aerial vehicle (UAV), the method comprising: collecting a set of images corresponding to different fields of view of an environment around the UAV using multiple image capture devices, each of the multiple image capture devices having the different fields of view while traversing a flight path; extracting a set of feature points from the set of images while traversing the flight path; and selecting a subset of the feature points from the set of feature points to be stored for navigational aid, based on a number of image capture devices that collect an image including the feature points.

Furthermore, aspects of the disclosure may be directed to an apparatus for controlling flight of an unmanned aerial vehicle (UAV), the apparatus comprising: one or more processors, individually or collectively configured to: receive a set of images corresponding to different fields of view of an environment around the UAV collected using multiple image capture devices, each of the multiple image capture devices having the different fields of view while traversing a flight path; extract a set of feature points from the set of images while traversing the flight path; and select a subset of the feature points from the set of feature points to be stored for navigational aid, based on a number of image capture devices that collect an image including the feature points.

It shall be understood that different aspects of the disclosure may be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference in its entirety.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

An unmanned aerial vehicle (UAV) may traverse an environment. The UAV may record information about its flight path. The UAV may have an auto-return function that may enable the UAV to return to a starting point in its flight path. In some instances, an event may occur, or a command may be received where it may be desirable to initiate an auto-return function for the UAV. Visual cognition may be a useful tool for auto-return since it may not rely on communications with external objects. Some navigational tools, such as a global positioning system (GPS), on its own may be unreliable in situations where a signal with one or more satellites may cut out.

Systems and methods are provided herein for vision-based auto-return. In some embodiments, the UAV may rely on collection and analysis of visual data to follow the auto-return function. The UAV may use multiple cameras supported by the UAV to collect image data that may aid in navigation of the UAV. The multiple cameras may be oriented at different directions relative to one another, and may have different fields of view. The multiple cameras may cover a lateral 360 degree area. In some embodiments, the multiple cameras may cover a spherical 360 degree spatial field. The UAV may use the collected image data to in conducting its auto-return function.

As multiple cameras may be collecting image data in parallel, the image data may be stored and/or processed to aid in UAV navigation. When the UAV is performing its auto-return, the UAV may be collecting image data and analyzing stored image data in substantially real-time. This may place significant demand on processing and memory storage capabilities of the UAV. The auto-return systems and methods described herein may utilize selected storage of image data to reduce the demand. For instance, selected features from images, such as feature points, may be stored. In other instances, selected features from selected images may be stored.

Optionally, such selection may be based on one or more parameters. For instance, the selection may be based on the number of cameras that a particular feature or object appears in. The selection may depend on a comparison with other images in a time-based sequence of images. For instance, the selection may be depend on a degree of overlap between images within a sequence of images, or a degree of overlap between feature points within a set of feature points. In some instances, only image data pertaining to stationary objects within an environment may be saved. For instance, only stationary feature points within an environment may be saved. The selection may be based on movement characteristics of the UAV, such as speed or direction of the UAV.

Figure 1:
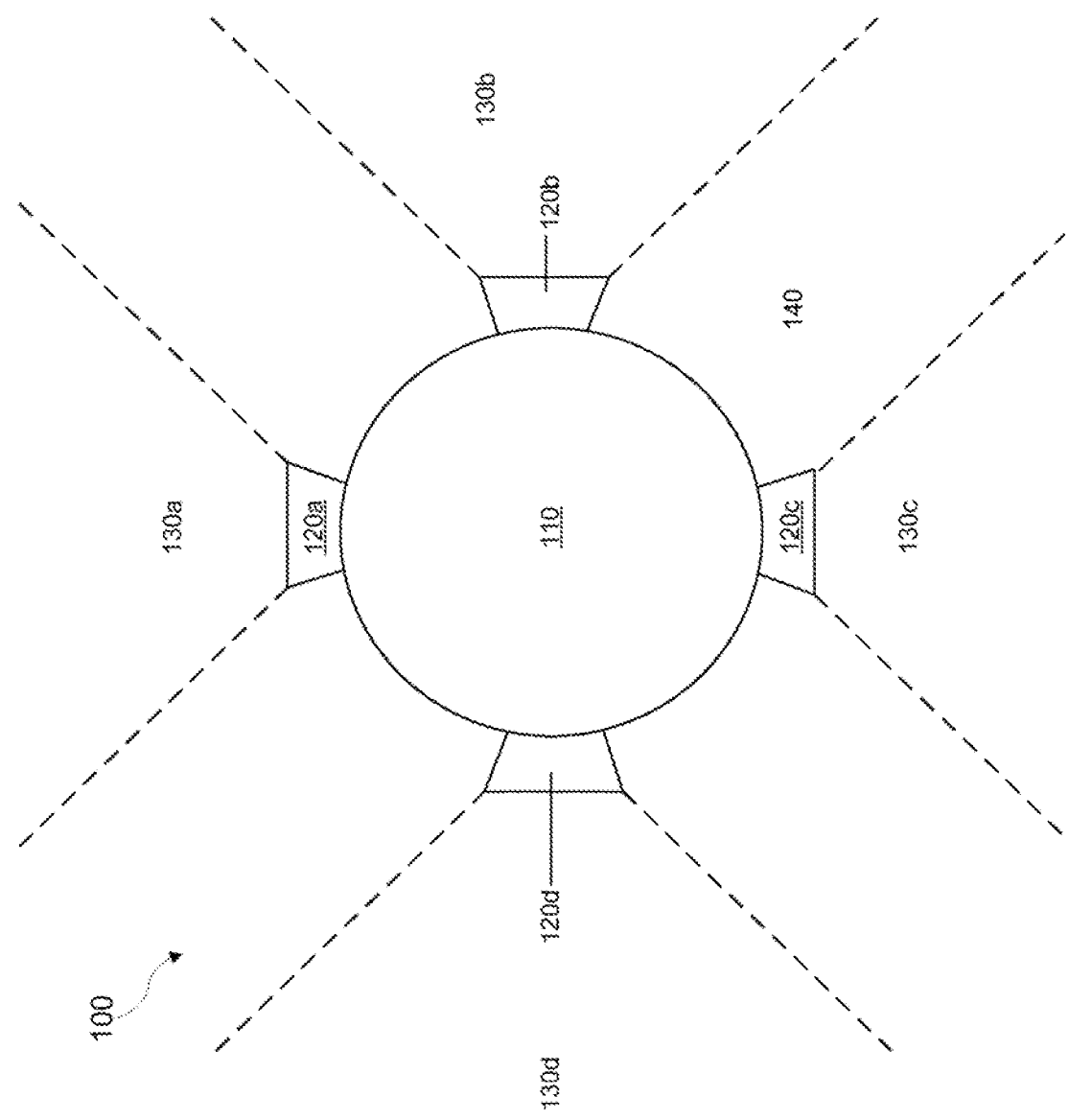
FIG. 1 shows a schematic top view of an unmanned aerial vehicle (UAV) having multiple cameras facing in different directions, in accordance with embodiments of the disclosure.

FIG. 1 shows a schematic top view of an unmanned aerial vehicle (UAV) having multiple cameras facing in different directions, in accordance with embodiments of the disclosure. Having multiple cameras may enable a UAV to collect image data from a greater portion of the environment. The multiple cameras may enable the UAV to navigate an environment regardless of the orientation of the UAV.

A UAV 100 may have a UAV body 110. The UAV body may support one or more cameras 120a, 120b, 120c, 120d. Each camera may have a corresponding field of view 130a, 130b, 130c, 130d. Optionally, there may or may not be blind spots 140 that may not be covered by a camera field of view.

Any description herein of a UAV 100 may apply to any type of aerial vehicle, and vice versa. The aerial vehicle may or may not be unmanned. Similarly, any description herein of a UAV may apply to any type of movable object, and vice versa. A movable object may be a vehicle capable of self-propelled movement. The vehicle may have one or more propulsion units that may be capable of permitting the vehicle to move within an environment. A movable object may be capable of traversing on land or underground, on or in the water, within the air, within space, or any combination thereof. The movable object may be an aerial vehicle (e.g., airplanes, rotor-craft, lighter-than air vehicles), land-based vehicle (e.g., cars, trucks, buses, trains, rovers, subways), water-based vehicles (e.g., boats, ships, submarines), or space-based vehicles (e.g., satellites, shuttles, rockets). The movable object may be manned or unmanned.

A UAV may have a UAV body 110. The UAV body may optionally include a housing that may enclose one or more components of the UAV. For instance, a housing may enclose one or more electrical components of the UAV. Examples of electrical components may include, but are not limited to, a flight controller of the UAV, an inertial measurement unit, a power supply unit, a memory storage unit, one or more processors, a navigational unit (e.g. GPS), a communication unit, one or more electronic speed controls (ESCs), one or more actuators, or one or more sensors. Examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). The UAV body may support one or more components, such as one or more of the electrical components. The one or more components may be within a housing, outside a housing, embedded into a housing, or any combination thereof.

The UAV body may be a central body. Optionally one or more arms may extend from the central body. An arm may support one or more propulsion units that may aid the UAV in flight. The propulsion units may include one or more rotors that may generate lift for the UAV. The propulsion units may include a rotor blade and a corresponding actuator that may effect rotation of the rotor blades about an axis. The lift may be in the direction of the axis. In some embodiments, one or more, two or more, three or more, four or more, five or more, six or more, seven or more, eight or more, ten or more, twelve or more, twenty or more, or thirty or more arms may extend from the central body. Each arm may have one or more, two or more, three or more, four or more, or five or more propulsion units supported by the arm.

The UAV may have any other characteristic as described in greater detail elsewhere herein. Any description herein of a UAV may apply to any movable object having a characteristic as described in greater detail elsewhere herein.

The UAV may support one or more cameras 120a, 120b, 120c, 120d. Any description herein of a camera may apply to any type of image capture device, and vice versa. A camera may be a physical imaging device. An imaging device can be configured to detect electromagnetic radiation (e.g., visible, infrared, and/or ultraviolet light) and generate image data based on the detected electromagnetic radiation. An imaging device may include an image sensor, such as a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The camera may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The camera may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The camera may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

One or more cameras supported by the UAV may have one or more of the same parameters, characteristics or features. In some instances, all of the cameras supported by the UAV may have the same characteristics or features. Alternatively, one or more of the cameras supported by the UAV may have different characteristics or features. In some instances, each of the cameras supported by the UAV may have different characteristics or features.

The one or more cameras may be supported by a UAV body. The one or more cameras may be supported on a central body of the UAV. The one or more cameras may or may not be supported on one or more arms of the UAV. The one or more cameras may be supported by a housing of the UAV. The one or more cameras may be attached to an external surface of the housing the UAV. The one or more cameras may be embedded within an external surface of the housing of the UAV. The one or more cameras may have an optical element, such as a lens, that may be exposed to an environment exterior to the UAV. The optical element may optionally be protected from an environment exterior to the UAV with aid of a cover. The cover may be transparent. The cover may or may not include an optical filter.

Any number of cameras may be provided. For instance, there may be 1 or more, 2 or more, 3 or more, 4 or more, 5 or more, 6 or more, 7 or more, 8 or more, 9 or more, 10 or more, 12 or more, 15 or more, 18 or more, 20 or more, 21 or more, 22 or more, 24 or more, 25 or more, 27 or more, 30 or more, 35 or more, 40 or more, 45 or more, 50 or more, 60 or more, 70 or more, or 100 or more cameras supported by the UAV.

The cameras may be stationary relative to a UAV body. The cameras may be configured so that they do not move relative to the UAV body during operation of the UAV (e.g., flight of the UAV). The cameras may be configured so that they do not move relative to the UAV body during operation of the camera (e.g., capturing images by the camera). The cameras may be affixed relative to the UAV body. In some embodiments, all of the cameras supported by the UAV may be stationary relative to the UAV. Alternatively, only a selected number of cameras or none of the cameras supported by the UAV may be stationary relative to the UAV.

The cameras may be movable relative to a UAV body. The cameras may be configured so that they are capable of movement relative to the UAV body during operation of the UAV (e.g., flight of the UAV). The cameras may be configured so that they are capable of movement relative to the UAV body during operation of the camera (e.g., capturing images by the camera). The cameras may include one or more carriers or components that may enable the cameras to move relative to the UAV body. For instance, a camera may translate along one, two or three directions relative to the UAV body, or rotate about one, two, or three axes relative to the UAV body. The camera may be supported by a carrier having a gimbaled frame assembly. Any characteristics described elsewhere herein for a payload and a carrier may be applied. The camera may be moved relative to the UAV body with aid of one or more actuators. In some embodiments, all of the cameras supported by the UAV may be movable relative to the UAV. Alternatively, only a selected number of cameras or none of the cameras supported by the UAV may be movable relative to the UAV.

The multiple cameras 120a, 120b, 120c, 120d may be arranged so that they have different fields of view 130a, 130b, 130c, 130d relative to one another. In some embodiments, each of the multiple cameras supported by a UAV body may have different fields of view relative to one another. Alternatively, one or more of the cameras supported by the UAV body may have the same field of view relative to one another. One or more of the cameras may have a different orientation relative to one another. Optionally, each of the cameras supported by the UAV may have a different orientation relative to one another. Alternatively, one or more of the cameras may have the same orientation. A camera may have an optical axis that may pass through a lens of the camera. The optical axes of one or more, or all, of the cameras may be at different orientations relative to one another. In some embodiments, the orientation of the cameras may differ by at least 1, 2, 3, 4, 5, 6, 7, 8, 10, 12, 15, 20, 25, 30, 35, 40, 45, 60, or 90 degrees. In some embodiments the orientation of the cameras may differ by less than any of the angle measurements described herein. The orientation of the cameras may differ by a degree falling within a range between any two of the values described herein.

The cameras may be arranged so that the different fields of view span a 360° panoramic view around the UAV. A 360° panoramic view of around the UAV may be provided so that there are few or no blind spots laterally in a 360 degree region around the UAV. The cameras may be arranged so that the different fields of view span a 360° vertical view around the UAV. A 360° vertical view of around the UAV may be provided so that there are few or no blind spots vertically in a 360 degree region around the UAV. The cameras may be arranged so that the different fields of view span a spherical space around the UAV. A spherical view of around the UAV may be provided so that there are few or no blind spots horizontally in a 360° lateral view around the UAV and vertically in a 360 degree region around the UAV.

FIG. 1 provides an illustration where one or more blind spots 140 may be provided laterally around the UAV by way of example only. In some embodiments, such blind spots may not exist more than 1 cm, 5 cm, 10 cm, 15 cm, 20 cm, 25 cm, 30 cm, 40 cm, 50 cm, 60 cm, 70 cm, 80 cm, 90 cm, 1 m, 1.5 m, 2 m, 3 m, 5 m, 10 m, 20 m, 30 m, or 50 m away from the UAV. For instance, all spatial views may be covered by at least one camera at any of the distances described away from the UAV surface. The fields of view may overlap to prevent the existence of blind spots. In some instances, there may be no blind spots within an entire spherical space around the UAV. There may be no blind spots within a 360° lateral and/or a 360° vertical span around the UAV.

One or more of the different fields of view may overlap with one another. For instance, multiple cameras may simultaneously capture an image of a portion of an environment. In some instances, each field of view may partially overlap with another adjacent field of view.

Thus, using the multiple cameras, the UAV may be able to obtain multi-directional image information from the environment that the UAV is traversing. The UAV may be able to obtain substantially omni-directional image data from the environment, when sampling image data from all directions. Even if the vehicle changes orientation during operation, coincident image information can be captured on at least one of the cameras, which would significantly improve reliability for generating an auto-return path. Using only a single camera would provide increased risk of an inaccurate turn voyage. By using the multiple cameras, such as cameras that cover the entirety of the space around the UAV, there is a reduced risk of inaccuracies for a return voyage.

Figure 2:
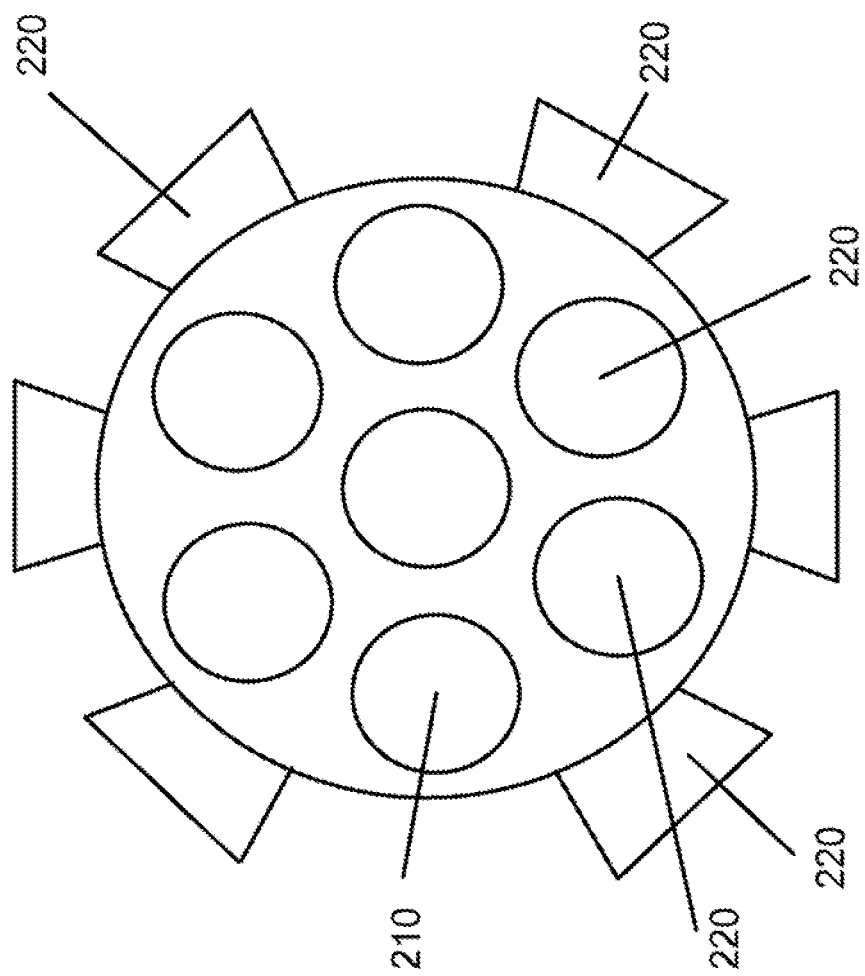
FIG. 2 shows a schematic example of cameras that may be spatially arranged on a UAV body, in accordance with embodiments of the disclosure.

FIG. 2 shows a schematic example of cameras 220 that may be spatially arranged on a UAV body 210, in accordance with embodiments of the disclosure. As previously described, in some embodiments, the multiple cameras may be directed so that substantially an entirety of a spherical space around the UAV may be captured on camera.

The number and/or positioning of the camera may be selected in order to prevent the existence of blind spots. In some instances, no blind spots may be provided at a specified distance away from the UAV, such as those distances previously described above. Any number of cameras may be spatially arranged to span the spherical space, such as any of the numbers described elsewhere herein. In one example, 21 cameras may be distributed over the UAV body. Each camera, or a subset of the cameras may have a spatial orientation that is different from the other cameras. The spatial orientation may be different with respect to a yaw axis, roll axis, and/or pitch axis of the UAV.

The number and/or positioning of the camera may be selected based on a field of view of the cameras. For instance, if the cameras have a wider field of view, fewer cameras may be required to capture images from the desired space around the camera. If the cameras have a narrower field of view, a larger number of cameras may be required to capture images from the desired space around the camera. In some instances, wide-angle cameras may be employed to reduce the number of cameras.

The number and/or positioning of the camera may be selected to provide a desired amount of overlap between fields of view. It may be desirable for adjacent cameras to have fields of view overlapping by at least 1%, 3%, 5%, 10%, 15%, 20%, 25%, 30%, 40%, 50%, 60%, 70%, 80%, or 90%. In other instances, it may be desirable for adjacent cameras to have fields of view overlapping by less than any of the percentages described herein. Adjacent cameras may have fields of view that overlap by a percentage falling within a range between any two of the values described herein.

Figure 3:
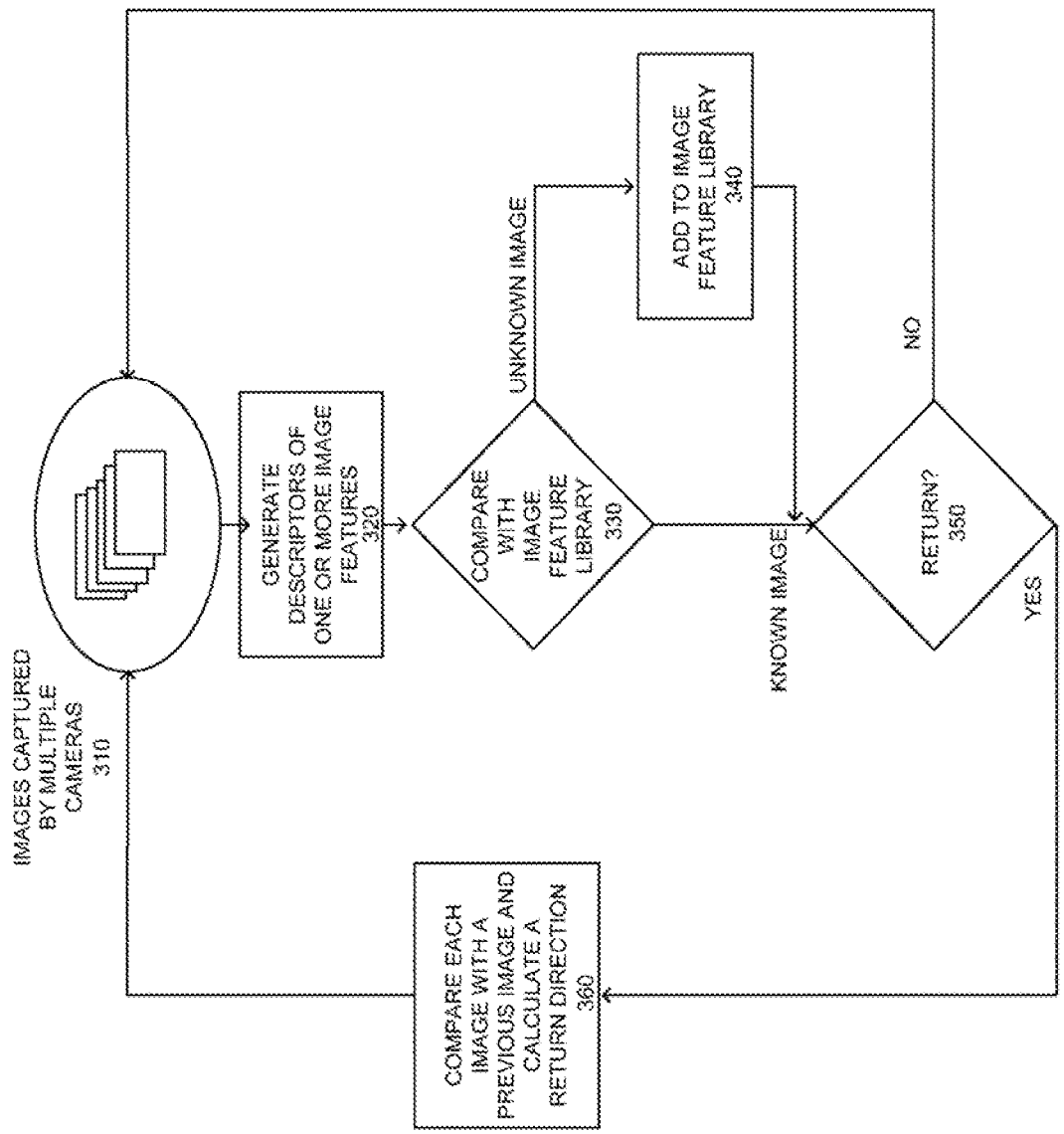
FIG. 3 shows a flow chart of an exemplary auto-return process, in accordance with embodiments of the disclosure.

FIG. 3 shows a flow chart of an exemplary auto-return process, in accordance with embodiments of the disclosure. Images may be captured using the multiple cameras 310, while the UAV traverses an environment. Descriptors of one or more image features may be generated 320. The image features may be compared with an image feature library 330. If the image feature is unknown, the image features may be added to the image feature library 340. If the image is already known, a determination may be made whether to initiate an auto-return procedure 350. If no auto-return, the multiple cameras may continue to capture images during flight of the UAV 310. If an auto-return procedure is to be started, the currently collected images are compared with a previous image to calculate a return direction 360.

Images may be captured using the multiple cameras 310, while the UAV traverses an environment. At a given location or point in time, each of the multiple cameras may capture an image. Each of the multiple cameras may capture the image substantially simultaneously (e.g., within less than 0.001, 0.005, 0.01, 0.05, 0.1, 0.3, 0.5, 1, 1.5, 2, 3, 5, 7, 10, 15, or 20 seconds of one another). Each of the multiple cameras may capture images while the UAV is substantially at the same location (e.g., within less than a 0.001, 0.005 0.01, 0.05, 0.1, 0.5, 1, 2, 3, 5, 10, 15, 20, 30, 40, 50, 70, 100, 200, 300, 500, or 1,000 cm shift of the UAV). In some embodiments, a set of images may correspond to images from the multiple cameras collected substantially at the same time or place. For instance, a first set of images may be collected at substantially at a first time and/or first location while a second set of images may be collected at substantially a second time and/or second location.

Sets of images may be stored with location information about where the image is captured. In some instances, the location information may be provided with aid of one or more navigational sensor. For instance, GPS coordinates may be stored with the corresponding sets of image data. The GPS coordinates may be the GPS coordinates of the UAV. Sets of images may be stored with timing information about when the image was captured. For instance, a timestamp may be located with a set of images, or each individual image within the set of images. In some embodiments, information about which camera collected each image may be associated with each individual image within the set of images. For example, a corresponding camera identifier may be stored with each image. Information about the positioning of the camera (e.g., orientation of the camera) relative to the UAV or an inertial reference frame (e.g., the environment) may be provided. In some instances, the positioning of the UAV (e.g., orientation of the UAV relative to the inertial reference frame may be provided for the set of images. The positioning of each camera relative to the UAV may be known, and a positioning of each camera relative to the inertial reference frame may be calculated. Thus, the positioning (e.g., orientation) associated with each image of the image set may be calculated or stored.

The images may be captured substantially in real-time as a streaming image. The images may be captured with any frequency (e.g., at least 1 Hz, 3 Hz, 5 Hz, 10 Hz, 20 Hz, 30 Hz, 40 Hz, 50 Hz, 60 Hz, 70 Hz, 80 Hz, or 100 Hz). In some instances, the images may be captured at even intervals in time. Alternatively, the intervals of the image capture may vary. The interval of the image capture may vary depending on a movement characteristic of the UAV, (e.g., linear speed, linear acceleration, rotational speed, and/or rotational direction of the UAV). For instance, if the UAV is traveling more rapidly, the images may be captured at a higher frequency. Alternatively, the images may be captured at the same frequency regardless of movement of the UAV. Optionally, each of the multiple cameras may be operating at the same frequency. Alternatively, different cameras from the multiple cameras may operate at different frequencies.

Multiple sets of images can be captured while a UAV traverses an environment. Such images may be stored and/or transmitted to an external device. In some instances, all of the image data may be stored, or only a selection of the image data may be stored. In some instances, all of the image data may be stored for replay, but only a selection of the image data may be used to aid in navigation.

Descriptors of one or more image features may be generated 320. The image features may be generated as a selection of the image data that may be used to aid in navigation. Data about image features of a set of images may be less than the data about an entirety of the set of images. In some embodiments, image features may be extracted on a set by set basis. For instance, a first set of image features may be extracted from a first set of image data. A second set of image data may be extracted from a second set of image data. The first set of image data may be extracted prior to, concurrently with, or subsequent to collection of the second set of image data. In some embodiments, an example of an image feature may be feature points of an image, as described in greater detail elsewhere herein.

In some examples, the image features may be the selected image data as described elsewhere herein. For instance, the image features may be extracted and stored for navigational aid without storing the set of images for navigational aid. The set of images may or may not be stored in memory at all.

Descriptors of the images may include image features. In some embodiments, the descriptors may include an analysis of the images. For example, a descriptor may be a histogram generated based on the image data. The descriptor may be generated based on the entirety of the image data from a set, or may be generated based on image feature information from the set. The descriptor may include a histogram pertaining to feature points from the image set. The descriptor may pertain to a selected subset of the features, such as feature points from the image set. A histogram may compare distribution of the features (e.g., feature points) spatially and/or temporally within a set of images or a sequence of images.

One or more descriptors from a set of images (e.g., image features) may be compared with an image feature library 330. An image feature library may include images or image features from previous sets of image data. The image library may be added to as the UAV traverses the environment. The image feature library may store images or image features from a current trip or operation of the UAV. The image feature library may or may not store images or image features from previous trips or operations of the UAV. For instance, image feature library data for a trip may be stored only during that trip of the UAV. The image feature library data for a particular operation of the UAV may only be stored for that operation of the UAV (e.g., while the UAV is powered on).

In one example, image features from the set of images may be compared with the image feature library to determine if these image features are already in the image feature library. The comparison may be made to determine whether a similar area or location with an environment has been previously passed or captured in the image library. The comparison may be made to determine if a particular scene, object or landmark within the environment has been previously stored in the image library.

The comparison may look at the similarity of the descriptor with the historical image data (e.g., similarity between the image features from the current image set and the historical image features collected from previous sets of image data). If the similarity exceeds a particular threshold (e.g., threshold ratio value), then it is determined the images are similar. For instance, if the similarity exceeds a 10%, 20%, 30%, 40%, 50%, 60%, 70%, 80%, 90%, 95%, 97%, or 99% match, it may be determined that the images (or the scene, object, or landmark) are the same.

If the image feature is unknown, the image features may be added to the image feature library 340. If the similarity did not exceed the threshold value, then the descriptor (e.g., image feature or image) may be added to the image feature library. After adding to the image feature library, a determination may be made whether to initiate an auto-return procedure 350.

If the image is already known (e.g., the similarity did exceed the threshold value) then the descriptor (e.g., image feature or image) need not be added to the image feature library. A determination may then be made whether to initiate an auto-return procedure 350. The determination may be made based on whether the UAV is in auto-return mode, or still within a regular flight mode.

An auto-return mode may be entered in response to an event. For instance, UAV may enter an auto-return mode in response to a command from an external device. For instance, a user may be operating the UAV with aid of a remote controller. The user may select an option using the remote controller to initiate the auto-return mode.

In another example, the auto-return may occur when a UAV reaches a target location. In some instances, a target location may be specified prior to, or during flight of the UAV. The target location may be specified by the user of the UAV. The target location may optionally be specified using a remote controller. The user may alter the target location during operation of the UAV. The target location may specified with aid of one or more processors on-board the UAV or off-board the UAV. The target location may be specified automatically without requiring user input. The target location may be expressed as a geographic location within an inertial reference frame. For instance, a point on a map may be selected, or a set of coordinates may be provided for the target location. The target location may be specified as a target object, which may be stationary or moving. When it is confirmed that the UAV reaches the target location, an auto-return function may be automatically initiated.

The auto-return function may be engaged when an error or malfunction is detected on-board the UAV. For instance, if there are detected sensor errors or hazardous conditions, the UAV may be instructed to automatically return.

When a loss of control or other similar condition is detected, the auto-return function may be initiated. For instance, when it is detected that the UAV is tumbling, or the user is not able to control the UAV, the auto-return mode may be entered.

The auto-return mode may be entered in response to a detected condition. For instance, the UAV may fly for a specified length of time, and then may be required to enter an auto-return mode. The specified length of time may be determined by a user of the UAV. For example, a user may specify before the UAV starts the flight, that the user wants the UAV to return after an hour of flight. In other instances, the length of the flight may be determined by an external device or system, or with aid of one or more processors on-board the UAV. The flight time may be determined automatically without requiring human intervention.

Optionally, an auto-return mode may be initiated when a UAV loses communication with one or more external object. For instance, when the UAV loses communication with a remote controller, a remote satellite, a remote tower, or other type of external object, the UAV may automatically initiate an auto-return process. For instance, if the UAV loses a GPS signal, the UAV may initiate an auto-return process.

A power level of the UAV may be assessed to determine whether to initiate the auto-return mode. For instance, if the power supply level drops beneath a particular threshold value or percentage, an auto-return function may be automatically initiated. This may occur to ensure that the UAV has sufficient power to return to a starting point.

Any other condition may cause an auto-return mode to be entered. The visual auto-return systems and methods may assess whether the auto-return mode has been entered. If auto-return mode has not been entered, the multiple cameras may continue to capture images during flight of the UAV 310. Additional sets of images may be collected. In some instances, an assessment of whether an auto-return mode has been entered may occur after collection of each set of images. Alternatively, the assessment of whether the auto-return mode may have occurred may occur more infrequently, and several rounds of image sets may be collected.

If an auto-return mode is detected, then the image data captured by the multiple cameras may be utilized to determine a return route. The image data may be used alone or in combination with other navigational aids or sensors, as described in greater detail elsewhere herein. For instance, the currently collected image set may be compared with earlier image sets to calculate a return direction 360. When flying along the auto-return path, the UAV may be looking for the same scenes, objects, or landmarks it passed during its initial flight path. The comparison will assess whether the same image or image features can be found, and based on the comparison, will determine a direction for the UAV to travel in its auto-return path. The auto-return path may be generated in real-time as the sets of images that the UAV is collecting in its return voyage are compared with the sets of images collected during the initial flight out.

The auto-return path may be generated so that the direction for the UAV to travel in the auto-return path is generated using some sort of voting and/or average algorithm to determine which path to take. The path may be selected to try and closely match the initial flight path depending on a comparison of the images. The system may calculate a current relative position of the UAV using geometrical relationships between the UAV and features from the images, to cause the UAV to approach locations where the images have been captured before. Iterative methods, such as a random sample consensus (RANSAC) algorithm methods may be employed to make that determination, as provided in greater detail elsewhere herein.

In one example, a UAV may collect a first set of images that correspond to different fields of view of an environment around the UAV using the multiple cameras while traversing a flight path. Then a first set of image features may be extracted from the first set of images. This extraction may occur while the UAV is traveling along the flight path. The extraction may occur substantially in real-time. When the UAV is traveling along a return path, the UAV may collect a second set of images corresponding to different fields of view using the multiple cameras. Optionally, a second set of feature points may be extracted from the second set of images. The extraction may occur while the UAV is traveling along the return path. The extraction may occur substantially in real-time.

The generated auto-return path may substantially follow the initial flight path in reverse. For instance, the auto-return path may remain within 1, 3, 5, 10, 20, 30, 50, 100, 200, 400, 600, or 800 meters of the original flight path. Alternatively, the auto-return path may be different from the initial flight path. The auto-return path may deviate from the initial flight path may greater than any of the values described. The systems and methods described herein, utilizing the multiple cameras, may permit a UAV to have a different orientation when traversing the auto-return path compared to when traversing the initial flight path.

Figure 4:
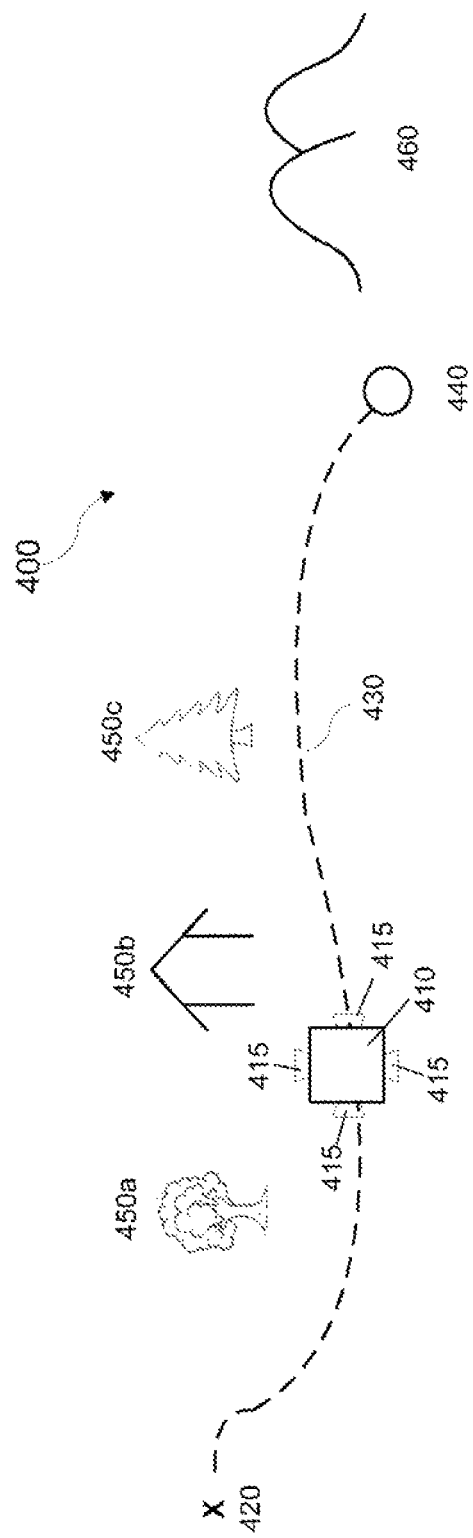
FIG. 4 shows an example of a UAV traversing a flight path within an environment, in accordance with embodiments of the disclosure.

FIG. 4 shows an example of a UAV traversing a flight path within an environment 400, in accordance with embodiments of the disclosure. A UAV 410 may start at a starting point 420 and have an initial flight path 430 to an end location 440 at which an auto-return function may be initialized. The UAV may optionally have multiple cameras 415. The UAV may pass one or more visual landmarks 450a, 450b, 450c within an environment. Various visual markers 460 may be captured by the multiple cameras of the UAV, even when the UAV is not necessarily passing the visual markers.

The UAV 410 may have any of the features or characteristics described elsewhere herein. The UAV may support multiple cameras 415. The cameras may be facing in different directions. The cameras may capture different fields of view to capture multiple images of the environment. The cameras may be arranged so that the UAV has a full 360° lateral panoramic view, and/or a full 360° vertical view. The cameras may be arranged to give the UAV a full spherical spatial view around the UAV. Thus, regardless of the orientation of the UAV, the UAV may be able to collect a full view of the environment around the UAV.

The UAV may start a flight path at a starting point 420. The starting point may be the location where a UAV is turned on. The starting point may be a location where the UAV takes off from an underlying surface. The starting point may be a location at which the UAV initiates flight. The starting point may be a location defined by a user as a start of the flight path (which may or may not be the same as a take-off location). The starting point may be a reference point defined by the user as a location for the UAV to auto-return to.

The UAV may traverse an initial flight path 430. An initial flight path may start at the starting point and may terminate at an end location 440.

The flight path may be manually controlled by a user. The user may control flight of the UAV in real-time and generate the flight path as the UAV traverses the path. Alternatively, the flight path may be pre-planned. The UAV may automatically follow the pre-planned flight path. The UAV may deviate from a pre-planned flight path when detecting stationary or moving obstacles. The UAV may employ collision avoidance maneuvers but may substantially return to a pre-planned flight path. A user may take manual control over the UAV while the UAV is following a pre-planned flight path and may deviate from the pre-planned flight path. In other instances, control may be taken away from a user and the UAV may be flown in an automated manner along the pre-planned flight path or along a flight path that may be generated with aid of one or more processors as the UAV traverses the flight path. A UAV may fly along the flight path in a manual, autonomous, or semi-autonomous manner. The flight path may or may not be predetermined. The flight path may or may not be determined on the fly.

The flight path may terminate at the end location 440. The end location may be a location at which an auto-return mode is entered. The end location may or may not be a predetermined target location or the location of a target object (e.g., stationary or moving target object). The end location may be determined in real-time in response to the UAV entering an auto-return mode. The end location may be determined in real-time in response to a detected condition that causes the UAV to enter an auto-return mode. A user may or may not specify an end location ahead of time or in real-time.

The UAV may pass by one or more visual landmarks 450a, 450b, 450c while traversing the environment. The one or more visual landmarks may be captured in one or more images captured by one or more of the UAV's cameras. Images captured by the UAV cameras may be assessed for one or more image features. Visual landmarks may have one or more discernible features. For instance, visual landmarks may permit the extraction of one or more feature points that may be stored, as discussed in greater detail elsewhere herein. Visual landmarks may or may not be unique. Visual landmarks may be discernible from background features. Visual landmarks may be distinguishable from one another. In some embodiments, visual landmarks may be substantially stationary.

While the UAV is collecting sets of images while traversing the flight path, the cameras may capture images of the visual landmarks. One or more image features may be extracted from the visual landmarks and stored and/or used for navigational aid.

Various visual markers 460 may be captured by the multiple cameras of the UAV, even when the UAV is not necessarily passing the visual markers. The visual markers may be visual landmarks that need not necessarily be passed by the UAV. For instance, the UAV may be approaching a visual marker or traveling away from a visual marker. As a UAV approaches a visual marker, the image of the visual marker may become larger. As a UAV travels away from the visual marker, the image of the visual marker may become smaller. As a UAV passes by a visual marker (e.g., visual landmark), the position of the visual marker within the image may change. Any combination of size and/or position change of a visual landmark may be indicative of a movement of the UAV relative to the visual marker.

Figure 5:
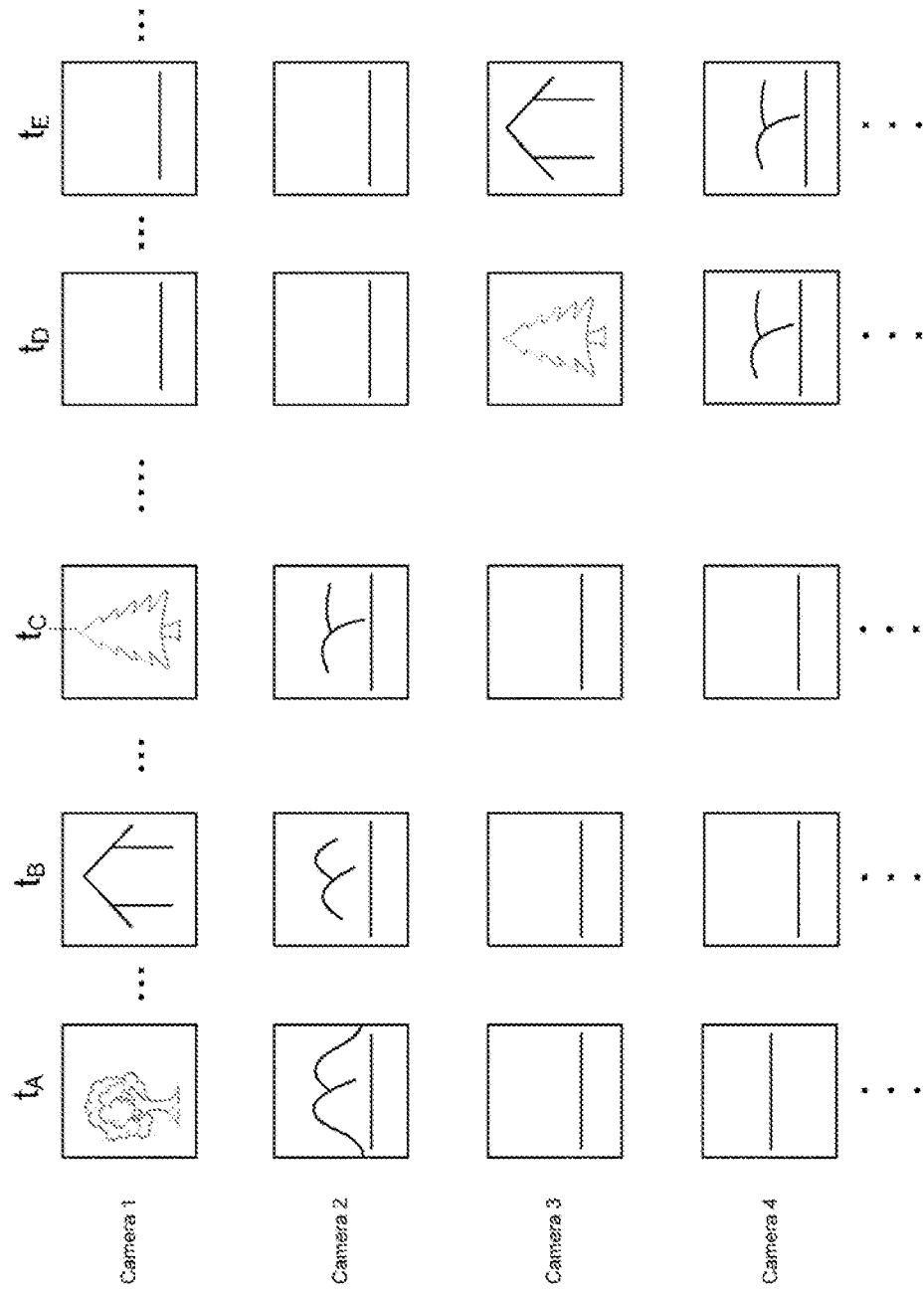
FIG. 5 shows examples of images that may be captured with aid of multiple cameras on the UAV while the UAV is traversing an environment, in accordance with embodiments of the disclosure.

FIG. 5 shows examples of images that may be captured with aid of multiple cameras on the UAV while the UAV is traversing an environment, in accordance with embodiments of the disclosure. Sets of images may be captured at multiple times $t_A$, $t_B$, $t_C$, $t_D$, $t_E$. Each set of images may include images from multiple cameras (camera 1, camera 2, camera 3, camera 4, . . . ). Several cameras are shown by way of illustration only, any number of cameras may be employed to capture various fields of view.

Any number of image sets may be collected during flight of a UAV. In one example, several sets (e.g., sets collected at $t_A$, $t_B$, $t_C$, may be collected while the UAV is flying along an initial flight path. Additional sets of images may be collected prior to $t_A$, $t_B$, $t_C$, subsequent to $t_A$, $t_B$, $t_C$, or between $t_A$, $t_B$, $t_C$. Examples of images from the various cameras for these corresponding image sets are provided. For instance, camera 1 may capture images of visual landmarks, such as a first tree, a building, and a second tree. In another example, camera 2 may capture images of a visual marker, such as a mountain range that gets progressive closer. Some cameras (e.g., camera 3, camera 4) may capture images of a relatively featureless portion of the environment.

In one example, several sets (e.g., sets collected at $t_D$, $t_E$, may be collected while the UAV is flying along a return path. Additional sets of images may be collected prior to $t_D$, $t_E$, subsequent to $t_D$, $t_E$, or between $t_D$, $t_E$. Examples of images from the various cameras for these corresponding image sets are provided. For instance, camera 3 may capture images of visual landmarks, such as a first tree, a building, and a second tree. These visual landmarks may be provided in reverse of the order they were collected using camera 1 during the initial flight path. In another example, camera 4 may capture images of a visual marker, such as a mountain range that gets progressive further away. These images may be substantially in reverse of the images of the mountain range that were collected using camera 2 during the initial flight path. Some cameras (e.g., camera 1, camera 2) may capture images of a relatively featureless portion of the environment.

By using multiple cameras, regardless of the orientation of the UAV, the relevant images may be captured and compared. For instance, due to a change in orientation of the UAV between the initial flight path and the return path, during the return, camera 3 may be facing the direction that camera 1 was initially facing, camera 4 may be facing the direction that camera 2 was initially facing, camera 1 may be facing the direction that camera 3 was initially facing, and camera 2 may be facing the direction that camera 4 was initially facing. Such changes in orientation of the UAV may occur about a yaw axis of the UAV, pitch axis of the UAV, and/or roll axis of the UAV.

As previously described, the images captured during the return flight of the UAV may be compared with those previously captured during the initial flight to determine a relative position of the UAV, and a direction that the UAV should continue on during the return flight. For instance, if a UAV passed a first tree, building, and second tree during the initial flight, the UAV may try to pass by the second tree, building, and first tree on its return path, so that the UAV has a relatively similar position relative to these landmarks during the return path.

Figure 6:
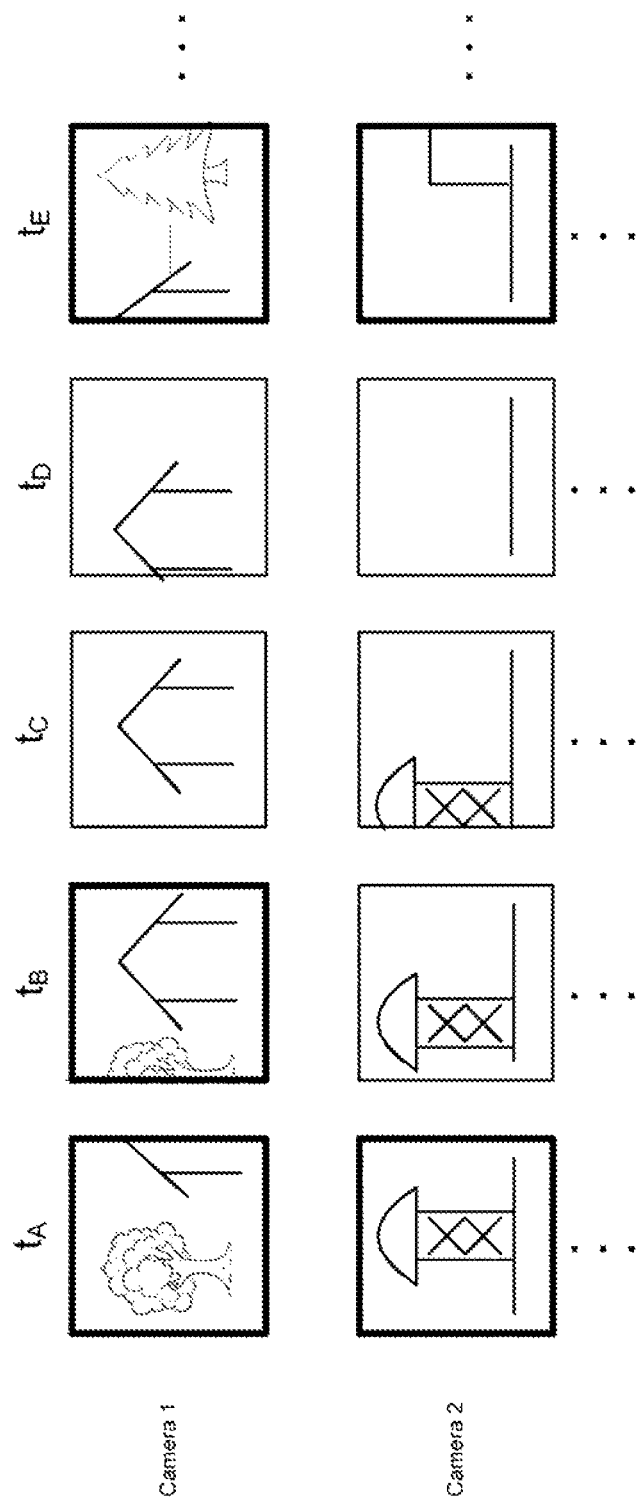
FIG. 6 shows an example of a sequence of images and how images may be selected, in accordance with embodiments of the disclosure.

FIG. 6 shows an example of a sequence of images and how images may be selected, in accordance with embodiments of the disclosure. As previously described, image sets may be captured at various locations/times along a flight path and/or return path. Each image set may include one or more images captured by one or more corresponding cameras. In some embodiments, each image set may include multiple images captured using multiple corresponding cameras.

In some embodiments, only a selected portion of the image data may be used for navigational aid. Only a selected portion of the image data may be stored for navigational aid. The entirety of the image data may or may not be stored for various other purposes. In some embodiments, images may be stored only if there are significant differences between the image and previously stored images. Such selective storing and/or processing may reduce the demand on the on-board resources of the UAV, such as on-board memory or processors.

For instance, camera 1 captures a series of images over time (e.g., at $t_A$, $t_B$, $t_C$, $t_D$, $t_E$). In some embodiments, the images may be analyzed for different features or objects. For example, the image at $t_A$ shows a tree with a portion of the building. The image at $t_B$ shows a portion of the tree with the entirety of the building. These images may be determined to have sufficiently different features to warrant that both images be saved or used for navigational aid. The bolding around the image frame may be used to indicate the images are saved or used for navigational aid. In some instances, the images in their entirety may be saved. Alternatively, the images in their entirety may not be saved and one or more extracted image features (such as feature points) may be saved.

The image at $t_C$ shows the same building shifted over, and the image at to shows the same building shifted further over. In some instances, since the building has already been stored, these images may be determined to not have sufficiently different features to warrant that these images also be saved and used for navigational aid. The lack of bolding around the image frame may be used to indicate that these images are not saved or are not used for navigational aid. By contrast, the image at the shows a new tree. The new tree may be considered to provide a sufficiently different feature to warrant that the image be saved or used for navigational aid, as indicated by the bold border.

In another example, camera 2 captures a series of images over time (e.g., at $t_A$, $t_B$, $t_C$, $t_D$, $t_E$). These images may also be analyzed for different features or objects. These images may be analyzed independently of the images collected by camera 1. For example, the image at $t_A$ shows a tower. The first image of the tower may be stored or used for navigational aid. The image at $t_B$ shows the same tower shifted over. The image at $t_C$ shows the same tower shifted even further over. In some instances, since the tower has already been stored, these images may be determined to not have sufficiently different features to warrant that these images also be saved and used for navigational aid. The image at to shows a relatively featureless image. The lack of a significant visual landmark or feature may cause the image to be determined to not have sufficiently different unit features to warrant that this image be also be saved and used for navigational aid. By contrast, the image at the shows a new structure. The new structure may be considered to provide a sufficiently different feature to warrant that the image be saved or used for navigational aid.

The images within a sequence may be compared to determine whether significant differences, to select which images or image features to store or use for navigational aid. The images within the sequence that are compared may be from the same camera. Alternatively, the images within the sequence that are compared may be from different camera. Images from each camera may be assessed individually within the sequence. In this scenario, if a first camera captured the image of the building, and a second camera also captured the image of the same building later on, such a comparison or assessment may not be made and both images may be saved or used for navigational aid. Alternatively, images from all of the cameras or a group of cameras may be assessed collectively within the sequence. Thus, if a first camera captured the image of the building, and a second camera also captured the image of the same building later on, a comparison or assessment may be made and if there is not sufficient difference, only the first image may be saved or used for navigational aid.

In some instances, the comparison between images may be comparison of one or more images as a whole. It may be determined how much the images overlap. In some embodiments, if the images overlap by more than a threshold amount, the subsequent image need not be saved or used for navigational aid may be sufficiently deemed to already be represented. For instance, the subsequent image may not be added to an image feature library. In some instances, the threshold amount may be about 5%, 10%, 15%, 20%, 25%, 30%, 35%, 40%, 45%, 50%, 55%, 60%, 65%, 70%, 75%, 80%, 85%, 90%, 95%, or 97% of the image.

Alternatively, the comparison between images may be a comparison of image features of the one or more images in a sequence. For instance, the comparison may be comparison of one or more feature points extracted from the images. Further description of feature extraction and comparison is provided in greater detail elsewhere herein. In some instances, the comparison may be provided on a pixel basis of the image. For instance, the images may be compared on a pixel by pixel basis to determine a degree of overlap, or whether there is sufficient difference to save the image. The images may be processed, balanced, or auto-corrected prior to performing the pixel by pixel analysis. The image features may include pixels.

In some embodiments, if the image features overlap by more than a threshold amount, the subsequent image features need not be saved or used for navigational aid may be sufficiently deemed to already be represented. For instance, the subsequent image features may not be added to an image feature library. In some instances, the threshold amount may be about 5%, 10%, 15%, 20%, 25%, 30%, 35%, 40%, 45%, 50%, 55%, 60%, 65%, 70%, 75%, 80%, 85%, 90%, 95%, or 97% of the image features.

The image or image features may be stored or used for navigational aid if they are below a threshold value, such as the threshold values described herein. The overlap between the images may be based on a comparison of multiple images taken at different points in time (e.g., images in a sequence). The images being compared may be taken by the same camera or different cameras. The overlap may be between image features, and may be a comparison of image features collected or extracted at different points in time (e.g., after images collected in a sequence).

The threshold value may be a static threshold value. Alternatively, the threshold value may be a variable threshold value. The threshold value may be changed in accordance with a user input. For instance, a user may provide a higher threshold if the user wishes to use less processing or memory on-board the UAV, or may provide a lower threshold if the user is less concerned with processing or memory on-board the UAV and is more concerned with accuracy. In some embodiments, the threshold value may be determined or changed with aid of one or more processors. The one or more processors may individually or collectively determine the threshold value based on a risk profile, complexity of the environment, movement characteristics of the UAV, or any other parameter. A greater risk aversion may result in a lower threshold. A greater complexity of the environment may result in a higher threshold to preserve memory or processing power, or may result in a lower threshold to preserve a less likelihood of missing features. Faster or more complex movement by the UAV may result in a lower threshold.

In some embodiments, the selection of images or image features for storage or use in navigational aid may occur only on the initial flight path. Such selection and/or storage may not be required on the return path. The images collected in real-time during the return path may be analyzed against the pre-stored data. In some alternative embodiments, such selection and/or storage may occur on the return path.

One or more sets of images may be collected while the UAV is traversing a flight path. One or more sets of image features (e.g., feature points) may be extracted from the one or more corresponding sets of images. A set of image features may be extracted from a corresponding image set while the UAV is traversing the flight path. The extraction may occur in substantially real-time. A subset of the image features (e.g., feature points) from the set of image features may be stored or used for navigational aid. The subset of image features may be selected based on a degree of overlap of the images or the image features, as previously described.

In some embodiments, the subset of images features may be selected based on movement of the UAV. For instance, more rapid linear or rotational movement of the UAV may result in less overlap between images within a sequence. Movement of the UAV (e.g., linear velocity, linear acceleration, angular velocity, angular acceleration) may be assessed. The positioning and/or movement of the UAV may be ascertained with aid of one or more sensors. The images from the cameras may or may not aid in ascertaining the positioning and/or movement of the UAV. A greater percentage or subset of the image features may be selected to be stored or used for navigational aid when a velocity is higher, compared to when a velocity is lower.

A determination whether the image features are stationary may also affect the subset of image features that are selected. In some instances, only stationary image features may be stored or used for navigational aid. Moving image features may optionally not be stored or used for navigational aid. Stationary image features may include features pertaining to visual landmarks that may remain stationary within the environment. Moving image features may include features pertaining to objects that may move within the environment. For instance, a feature point may be stored or used for navigational aid when the feature point is determined to be a stationary feature point and is not stored or used for navigational aid when the feature point is determined to be a moving feature point.

A determination may be made whether an image feature is stationary based on a comparison of multiple images of the image feature taken at different points in time. The multiple images may be captured by the same camera or by different cameras. Comparison of relative movements between features (e.g., background/stationary features and moving features) between images taken at different points in time may aid in the determination whether an image feature is stationary or moving. In some instances, the comparison may be made using a feature point by feature point comparison. In other instances, the comparison may be made using a pixel by pixel comparison.

In alternative embodiments, object recognition algorithms may be employed. The object recognition algorithms may analyze an image to determine which portions of the images are objects that are stationary, and which are objects that are moving. This may be used to determine which image features are stationary image features and which are moving image features. Such object recognition may not require the use of multiple images in sequence. Alternatively, they may be analyzed in combination with the analysis of the multiple images in sequence.

The stationary image features may be stored or use for navigational aid because they will not likely have moved between when a UAV makes an initial flight, and when the UAV makes a return flight. If the landmarks move significantly, it may be difficult for the UAV to find its way back, or it may likely be taking a different path. If the image features can be relied on to be stationary, this may aid in a more accurate determination of the positioning of the UAV along the return path while the UAV is returning.

Figure 7:
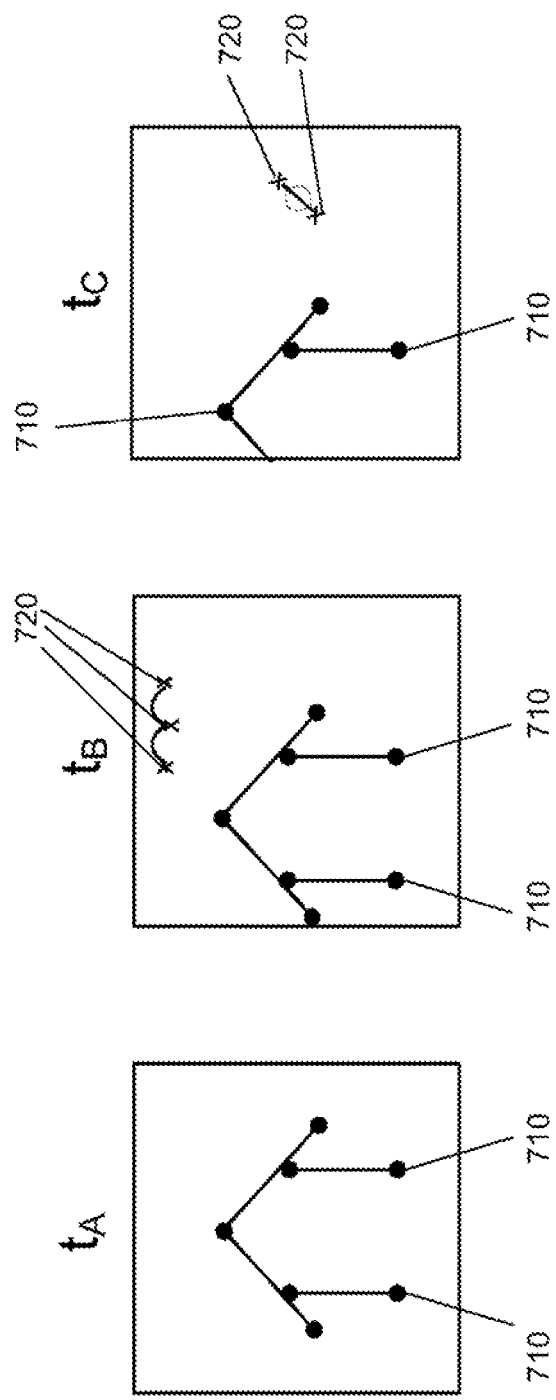
FIG. 7 shows an example of a sequence of images and how features may be selected in accordance with embodiments of the disclosure.

FIG. 7 shows an example of a sequence of images and how features may be selected in accordance with embodiments of the disclosure. As previously described, one or more images may be captured by a camera or a group of cameras. The images may be captured over time (e.g., $t_A$, $t_B$, $t_C$) to form a sequence of images.

In some embodiments, all of the image data from the sequence of images may be stored or used for navigational aid (e.g., during an initial flight of the UAV or during an auto-return flight of the UAV). Alternatively, all of the image data from the sequence of images are not stored or used for navigational aid. A selected subset of the image data (e.g., corresponding to selected features of the images) may be stored or used for navigational aid.

In one example, the image features may be feature points of the images. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image). Feature detection as described herein can be accomplished using various algorithms which may extract one or more feature points from image data and calculate the total number of feature points, or "feature point number." The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and calculate a feature point number using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof. In some embodiments, a scale-invariant feature transform (SIFT) algorithm may be employed alone or in combination with any of the others to detect and describe local features in images.

In some embodiments, all of the feature points may be stored or used for navigational aid. Alternatively, a subset of the feature points may be selected and stored or used for navigational aid. The selected feature points may be determined based on a degree of overlap between the feature points in the sequence. For example, at $t_A$, an object may be provided with one or more feature points 710. The feature points may be related to an object. At a subsequent time $t_B$, an image may show the same set of feature points along with additional feature points 720. In some embodiments, a high degree of overlap between the feature points may indicate that the subsequent image feature points need to be stored or used for navigational aid since they are sufficiently covered by the initial image. As previously described, a threshold degree of overlap may be used to determine whether to select the subsequent image feature points. The threshold degree of overlap may be static or variable.

The selected feature points may be determined based on an assessment of whether the feature points are stationary or are moving. In some embodiments a first set of feature points 710 may be deemed to be stationary feature points and/or a second set of feature points 720 may be deemed to be moving feature points. In some instances, images may be analyzed in a sequence to determine which feature points are stationary and which are moving. For instance, feature points that are consistent across the sequence of images and/or move in a predictable manner may be deemed to be stationary feature points. If the feature points appear and disappear, or move in an unpredictable manner, they may be deemed to be moving feature points. In some instances, object recognition or pattern recognition algorithms may be utilized to determine whether a feature point is stationary or moving. In some instances, only stationary feature points may be stored or used for navigational aid. The stationary feature points may be determined to reliably remain substantially in the same place to aid a UAV in finding its return path. Moving feature points may optionally not be stored or used for navigational aid. The moving points may not be reliable and may move between the time when the UAV is in on its initial flight path and when it follows its return path. If the UAV is looking for a moving object that is no longer there, it may be confused and not able to accurately follow the return path.

In some embodiments, an assessment may be made whether a feature point is a stationary feature point or a moving feature point while the UAV is following a return path. If a feature point is a stationary feature point, the stationary feature point may be compared with previously stored feature points to aid the UAV in navigation. If the feature point is a moving feature point, it may be ignored and not compared with previously stored stationary feature points.

The selected feature points may be determined based on a strength assessment of the feature points. In some embodiments, a certainty of a feature point may be assigned to the feature point. The feature point may only be stored if it is confirmed to pass a threshold value for the certainty. In some embodiments, the strength assessment of the feature point may depend on the appearance of the feature point in multiple image frames within the sequence. Even if not feature points from all images in the sequence are stored, the existence of another corroborating feature point may permit the feature point to be initially stored. Thus, for example, the corroborated feature points 710 may cause at least the first set of feature points from the first image frame ($t_A$) to be stored. The existence of the corroborating feature points at $t_B$ or $t_C$ may validate the storage of the first set of feature points.

The images and/or features (e.g., feature points) from the images may be captured at regular intervals or at variable intervals. In some instances, they may be captured at variable intervals depending on an operational parameter of the UAV. The operational parameter of the UAV may be movement characteristic of the UAV such as linear speed, angular speed, linear acceleration, and/or angular acceleration. For instance, if the UAV is moving more quickly or is rotating, the images and/or features may be captured more frequently.

In some embodiments, the images and/or features (e.g., feature points) from the images may be captured at variable intervals depending on environmental conditions. For instance, rapidly changing light conditions may cause the images and/or features to be captured more frequently. Any environmental condition that may affect a quality of the image or consistency of the images from frame to frame may be affecting the intervals. Other factors such as wind, dust, precipitation, temperature contrasts, may affect the intervals.

Figure 8:
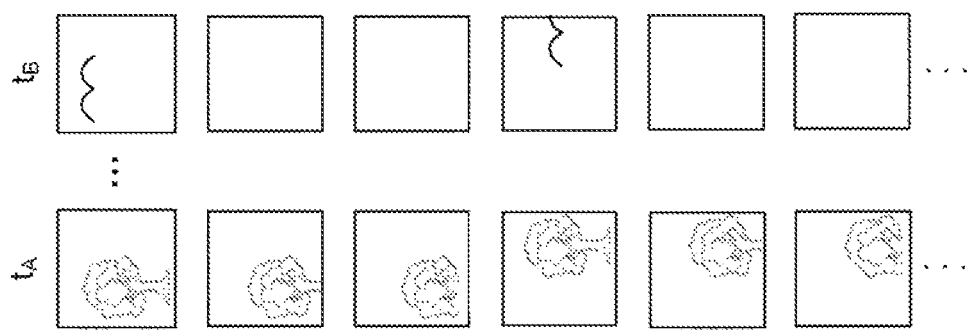
FIG. 8 shows an example of an object may be captured by multiple cameras carried on a UAV, each camera having different fields of view, in accordance with an embodiment of the disclosure.

FIG. 8 shows an example of an object may be captured by multiple cameras carried on a UAV, each camera having different fields of view, in accordance with an embodiment of the disclosure. In some embodiments, the fields of view of the multiple cameras may overlap to some extent. In some embodiments, a set of image features, such as image feature points may be extracted from the images. In some instances, a subset of the image features, such as a subset of the image feature points, may be selected to be stored or used for navigational aid, based on a number of image capture devices that collect an image including the feature (e.g., feature points).

For example, multiple cameras may capture an image of the same tree within a same set of images (e.g., at time=$t_A$). Images within the same set may be captured by cameras supported by the same UAV, at substantially the same time (e.g., small time range as previously presented) or location (as previously described). If the number of cameras that capture the same object exceed a threshold value, then the object may be deemed significant enough to store or use for navigational aid. In some instances, feature points may be extracted from the image. For instance, the feature points may correspond to feature of the tree. If the number of cameras that capture the same set of feature points exceed a threshold value, then the feature points may be stored or used for navigational aid.

The threshold number of cameras may be any number of cameras including, but not limited to 2 or more, 3 or more, 4 or more, 5 or more, 6 or more, 7 or more, 8 or more, 9 or more, 10 or more, 12 or more, 15 or more, or 20 or more. In some instances, the threshold number of cameras may be at least a threshold percentage of cameras including, but not limited to 1%, 3%, 5%, 7%, 10%, 12%, 15%, 20%, 25%, 30%, 35%, 40%, or 50% of the cameras capturing images for an image set.

In one example, the tree appears in at least six of the cameras simultaneously. The features extracted from the tree may be ascertained to have appeared in enough cameras for the features to be stored to aid in navigation. In some instances, only a single set of the features from one of the cameras, or a combination of the cameras may be stored. For example, a complete set of features representative of the tree may be stored, based on data from a single camera or multiple cameras. Alternatively, multiple sets of features corresponding to multiple cameras may be stored.

In another example, several cameras may capture an image within the same set of images (e.g., at time=$t_B$). In this case, image features may only appear in two of the cameras simultaneously. In some instances, these may not be enough cameras to meet the threshold. The image features may not be stored or used for navigational aid.

The higher number of cameras may be indicative that the feature was more likely accurately extracted and not extracted in error. The higher number of cameras may also indicate that the feature is valuable and useful for the auto-return. If the feature is likely to appear in multiple cameras, there is a high probability that the feature will be detected in the return trip. Also, if the feature is extracted in a large number of cameras, there is a greater probability that the feature will be extracted and/or recognized in the return trip.

Figure 9:
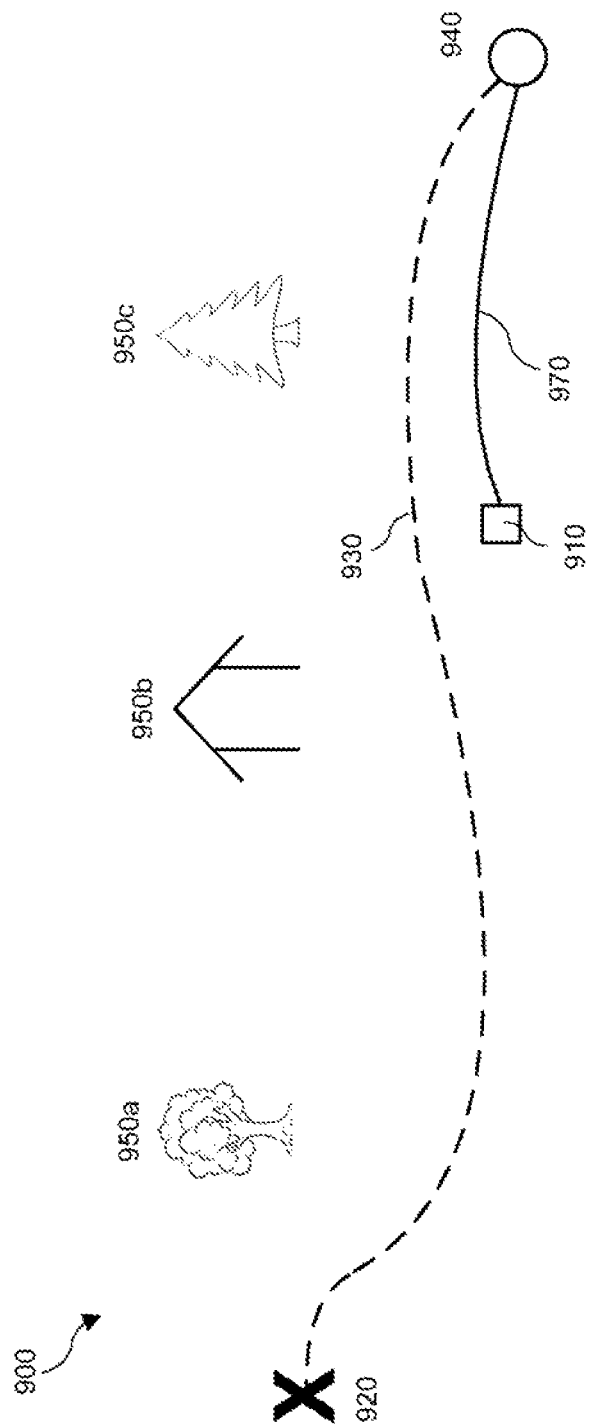
FIG. 9 shows an example of a UAV traversing a return path, in accordance with an embodiment of the disclosure.

FIG. 9 shows an example of a UAV traversing a return path, in accordance with an embodiment of the disclosure. The UAV may traverse an environment 900. The UAV 910 may start at a starting point 920 and have an initial flight path 930 to an end location 940 at which an auto-return function may be initialized. The UAV may pass one or more visual landmarks 950a, 950b, 950c within an environment. The UAV may start taking a return path 970 in response to initialization of an auto-return function.

The UAV 910 may have any of the features or characteristics described elsewhere herein. The UAV may support multiple cameras. The cameras may be facing in different directions. The cameras may capture different fields of view to capture multiple images of the environment. The cameras may be arranged so that the UAV has a full 360° lateral panoramic view, and/or a full 360° vertical view. The cameras may be arranged to give the UAV a full spherical spatial view around the UAV. Thus, regardless of the orientation of the UAV, the UAV may be able to collect a full view of the environment around the UAV.

The UAV may start a flight path at a starting point 920. The starting point may be the location where a UAV is turned on. The starting point may be a location where the UAV takes off from an underlying surface. The starting point may be a location at which the UAV initiates flight. The starting point may be a location defined by a user as a start of the flight path (which may or may not be the same as a take-off location). The starting point may be a reference point defined by the user as a location for the UAV to auto-return to.

The UAV may traverse an initial flight path 930. An initial flight path may start at the starting point and may terminate at an end location 940. The flight path may be manually controlled, or the UAV may be autonomous or semi-autonomous.

The flight path may terminate at the end location 940. The end location may be a location at which an auto-return mode is entered. The end location may or may not be a predetermined target location or the location of a target object (e.g., stationary or moving target object). The end location may be determined in real-time in response to the UAV entering an auto-return mode. The end location may be determined in real-time in response to a detected condition that causes the UAV to enter an auto-return mode. A user may or may not specify an end location ahead of time or in real-time. The UAV or a flight controller on-board the UAV may receive an instruction to traverse the return path. The instruction may start the initialization of the auto-return mode. The mode of operation of the UAV may be different for a return path 970 compared to an initial flight path 930. In the auto-return mode, a comparison may be initiated between a second set of image features (e.g., feature points) collected while the UAV traverses the return path with a first set of image features (e.g., feature points) collected while the UAV traverses the initial flight path.

The UAV may pass by one or more visual landmarks 950a, 950b, 950c while traversing the environment. The one or more visual landmarks may be captured in one or more images captured by one or more of the UAV's cameras. Images captured by the UAV cameras may be assessed for one or more image features. Visual landmarks may have one or more discernible features. For instance, visual landmarks may permit the extraction of one or more feature points that may be stored. Visual landmarks may or may not be unique. Visual landmarks may be discernible from background features. Visual landmarks may be distinguishable from one another. In some embodiments, visual landmarks may be substantially stationary.

While the UAV is collecting sets of images while traversing the flight path 930, the cameras may capture images of the visual landmarks. One or more image features may be extracted from the visual landmarks and stored and/or used for navigational aid. As previously described, in some embodiments, a subset of the one or more image features may be selected to be stored and/or used for navigational aid.

While traversing the return path 970 the UAV may collect additional sets of images. The cameras may capture images of the visual landmarks. In some instances, the same visual landmarks may be viewed as in the initial flight path. The same visual landmarks may be viewed in reverse order. In some instances, the UAV have multiple cameras that may permit the visual landmarks to be captured even if the UAV is in a different orientation when traversing the return path. The cameras may optionally be arranged in such a way so that if a landmark were detected during an initial flight path, it could be detected during the return path, even if the UAV is any other orientation.

A first set of features collected during an initial path may be compared with a second set of features collected during a return path. The comparison may comprise finding recognizable landmarks denoted by the features (e.g., feature points). The landmarks denoted by the features may be recognizable when the UAV return path varies from the initial flight path. The landmarks denoted by the features may be recognizable when the UAV has a different orientation during the return path from the initial flight path.

The return path of the UAV may be calculated and/or determined in real-time as the UAV traverses the return path. The return path may be determined based on a calculated relative positioning between the UAV and the landmarks. In some instances, an initial flight path of the UAV may be recorded based on visual navigation by detecting a location of a landmark and relative positioning of the UAV relative to the landmark. During the return path, the landmarks may be detected, and the return path of the UAV may be controlled to permit the UAV to have similar placement relative to the landmark during the return.

A direction of the UAV to travel during the return path may be determined by one or more algorithm. In some instances, a random sample consensus (RANSAC) method may be used to determined return path. In some other instances, a perspective n point (PnP) motion estimation may be used to determine a return path. The algorithms may be used to determine a UAV placement or desired placement relative to the landmarks denoted by one or more feature points. Current estimated UAV placement relative to a landmark may be compared to data about the initial flight path to determine a desired UAV placement relative to the landmark for that point in the return path. The UAV may be directed to the desired UAV placement.

As described, the return path of the UAV may follow the initial flight path in reverse. The UAV may be exactly on the initial flight path in reverse. Alternatively, the return flight path may have some variation to the initial flight path. In some instances, the UAV may remain within a particular distance threshold of an initial flight path.

Optionally the UAV may have a different return path from the initial flight path. The different return path may occur due to one or more detected conditions, such as one or more obstacles or inclement environmental conditions. The different return path may occur due to one or more other conditions that may prevent the UAV from following the initial flight path. The UAV may use visual navigation techniques to head back to the starting point. The UAV may use visual navigation techniques to head toward the initial flight path. Alternatively, the UAV may use visual navigation techniques to head back to the starting point without necessarily heading back to the initial flight paths. The visual navigation techniques may still utilize landmarks to keep track of UAV position, and make sure it is in a visual range that would enable it to find its way back to the starting point, but need not follow the exact return path back.

In some embodiments, the initial flight path may follow a circuitous or indirect path to the end point. The return path may closely follow the initial flight path back, even if it is circuitous or indirect. Even if some deviations are required during the return path due to conditions that do not enable the UAV to exactly follow the exact initial path in reverse, the UAV may try to follow the initial path as closely as possible, or return to the initial flight path when it is able. Alternatively, the UAV may find an alternative path back, but still utilizing the same visual landmarks or markers that were detected when the UAV made the initial flight path out. In some instances, the UAV may take a return path back that is less circuitous or roundabout than the initial path out. The UAV may be able to calculate a return flight path that is independent of the initial flight path, based on the visual markers. In some instances, the return flight path may be calculated to be the shortest distance to the starting point, the least amount of energy consumption to the starting point, and/or the least amount of time to get to the starting point. The return flight path may incorporate one or more of these parameters while retaining visual contact with the visual landmarks. Thus, if a shorter flight path may exist, but the UAV would lose recognizable visual contact with a visual landmark, the UAV may take a longer flight path that enables the UAV to retain recognizable visual contact with the visual landmark. There may be some margin of error or safety built in, so that the UAV may remain closer to the initial flight path than necessary to keep the recognizable visual contact.

In some instances, a UAV may follow an initial flight path and/or take a return path using visual navigation alone. For instance, the UAV may rely on information gathered by one or more cameras on-board the UAV to perform navigational functions. The UAV may rely on information gathered by the cameras alone collected during the initial flight path to determine a return flight path. The UAV may not need other data or navigational functions to perform the return flight. This may be useful in locations or scenarios where information from external sources may be unreliable. For example, if there is a bad wireless connection, the UAV may still be capable of performing an auto-return function based on information stored locally on-board a memory of the UAV and the visual sensors.

Optionally, the UAV may follow an initial flight path and/or take a return path using visual navigation in combination with any other type of navigational aid. In some embodiments, sensor fusion techniques may be employed to combine the visual navigation information with other types of navigation information. Any sensors or communication units provided on-board the UAV may be used in combination with the visual navigation information to control flight of the UAV during the initial flight path and/or return path.

In one example, navigation of the UAV may occur with aid of a GPS unit on-board the UAV. The GPS unit may comprise one or more GPS sensors. A GPS sensor can communicate with one or more GPS satellites to obtain one or more GPS data signals. The GPS sensor can be rigidly coupled to the UAV such that the position of the GPS sensor corresponds to the position of the UAV. Alternatively the GPS sensor can be permitted to move relative to the UAV with respect to up to six degrees of freedom. The GPS sensor can be directly mounted onto the UAV, or coupled to a support structure mounted onto the UAV. In some instances, the support structure may include a load, such as a carrier or payload.

The GPS signals received by the GPS sensor can be processed to determine the position of the UAV relative to a global reference frame (e.g., latitude, longitude, and altitude), and thereby determine the translational velocity and/or acceleration of the UAV. The GPS sensor can utilize any suitable GPS technology, such as differential GPS (DGPS) or real time kinematic (RTK) GPS. The GPS sensor can be configured to determine the position of the movable object to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy).

Such GPS information may be used to collect geo-spatial coordinate information for the UAV while the UAV is traversing the initial flight path and/or return flight path. The geo-spatial coordinate information may be coupled with visual navigation information, such as image features. The image features may be correlated with the geo-spatial coordinate information at the location where the image features are captured, or calculated to be located. For instance, a UAV may be at a first location when the UAV captures an image of a tree some distance away at a second location. Visual algorithms that may or may not employ analysis of multiple frames may be used to calculate the location of the object (e.g., tree) relative to the camera location (e.g., UAV location). The location of the UAV (e.g., first location) may be associated with the image and/or image features, and/or the location of the object (e.g., second location) may be associated with the image and/or image features. The geo-spatial coordinate information may aid in generation a map of the environment, as described in greater detail elsewhere herein. In some embodiments, GPS information may not be reliable, and/or may cut in and out while the UAV is traveling within an environment. The GPS information may be used to supplement the visual navigation information when available, but the system may be capable of operating without the GPS information if necessary.

A UAV may also comprise an inertial measurement unit (IMU), which can include one or more accelerometers, one or more gyroscopes, one or more magnetometers, or suitable combinations thereof. For example, the IMU can include up to three orthogonal accelerometers to measure linear acceleration of the UAV and/or camera on-board the UAV along up to three axes of translation, and up to three orthogonal gyroscopes to measure the angular acceleration about up to three axes of rotation. The IMU can be rigidly coupled to the UAV and/or camera such that the motion of the UAV and/or camera corresponds to motion of the IMU. Alternatively the IMU can be permitted to move relative to the UAV and/or camera with respect to up to six degrees of freedom. The IMU can be directly mounted onto the UAV and/or camera, or coupled to a support structure mounted onto the UAV and/or camera. The IMU can provide a signal indicative of a position or motion of the UAV and/or camera, such as a position, orientation, velocity, and/or acceleration of the UAV and/or camera (e.g., with respect to one, two, or three axes of translation, and/or one, two, or three axes of rotation). For example, the IMU can sense a signal representative of the acceleration of the UAV and/or camera, and the signal can be integrated once to provide velocity information, and twice to provide location and/or orientation information.

Such IMU information can be used to determine an overall position (e.g., spatial location and/or orientation) of the UAV and/or movement of the UAV in combination with visual navigation. In some instances, the IMU information may be used to determine an overall position and/or movement of one or more cameras carried by the UAV. The IMU information may be used to determine an overall position and/or movement of each of the cameras used for visual navigation by the UAV. In some embodiments, the UAV may support multiple cameras, each of which may have a different orientation. In some instances, the IMU may collect information about the orientation of each of the multiple cameras separately using different sensors (e.g., camera 1 may have one or more sensors that detect the position and/or movement of camera 1, camera 2 may have one or more sensors that detect the position and/or movement of camera 2, . . . ). Alternatively, each camera may have a known orientation relative to the UAV orientation, and knowing the UAV position (e.g., orientation/spatial location) may allow the position of each camera to be calculated. The IMU information may be used to determine the orientation of each of the cameras supported by the UAV.

The IMU information may be coupled with visual navigation information, such as image features. The image features may be correlated with the IMU information of the UAV and/or camera at the location where the image features are captured. For instance, a camera may have a particular position when the UAV captures an image of a tree as a visual landmark. The IMU information may be used to determine a relative position of the visual landmark relative to the UAV. Visual algorithms that may or may not employ analysis of multiple frames may be used to calculate the position of the camera and/or UAV may be associated with the image and/or image features, when the image is taken.

The IMU information may aid in generation a map of the environment, as described in greater detail elsewhere herein. The IMU information may be gathered using one or more sensors on-board the UAV. The IMU information may not require external signals, reflections or communications. The IMU and visual data may be used in combination with one another even when external communications or wireless signals are not working.

In some embodiments, visual navigation may be used in combination with GPS information and/or IMU information. Additional information any additional sensors described elsewhere herein, such as location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors) may be used.

In some embodiments, one or more image features may be extracted from one or more images. In some instances, all of the image features, or a subset of the image features may be selected for storage or use in navigation of the UAV. For instance, a selection of the image features may be stored or used for the auto-return of the UAV. In some embodiments, the selection of the image features may include a subset of the feature points from the images.

The selection of the image features (e.g., the subset of the feature points) may be used to construct a map of the environment. One or more representations of landmarks that the UAV may encounter during flight may be stored on the map. For example, a map of the image features within the environment may be constructed. A map of the selected subset of feature points within the environment may be constructed. The map may be a three-dimensional map or a two-dimensional map. The map may or may not take altitude into account. The map may be constructed in real-time as the UAV traverses an initial flight path. The position of the UAV relative to the features within the map may be determined. The position of the UAV as it traversed the initial flight path may be provided within the map. The position of the UAV may include a spatial location and/or orientation of the UAV. The position of the UAV as it captured each image may be within the map. In some instances, the position of each camera (e.g., spatial location and/or orientation) supported by the UAV may be stored in the map or in a memory. The position of the UAV and/or camera may be determined along three spatial axes. The position of the UAV and/or camera may include a determination about three orthogonal axes, such as a pitch, yaw, and/or roll axis relative to the UAV and/or the camera.

The map may be used by the UAV when the UAV is planning and/or taking the return path. The UAV position relative to one or more landmark may be determined while the UAV is taking the return path. The UAV position relative to one or more image features (e.g., feature points) may be determined when the UAV is taking the return path. Sets of images collected by the UAV while the UAV is taking the return path may be used to determine the UAV position relative to the one or more image features. The UAV position relative to a UAV initial flight path may be determined during the return flight. In some instances, the UAV position relative to the one or more image features, and the position of the one or more image features relative to the UAV initial flight path may be used to determine the UAV position relative to the initial flight path.

As previously described, algorithms may be used to determine a UAV position and/or return path. RANSAC or PnP algorithms may be employed to aid in UAV return. In some instances, outlying image data, such as outlying feature points may be discounted when using the algorithms. A model of best fit for one or more inliers may be generated. A voting scheme may be utilized to select a model, which may be used to determine the auto-return path.

The map may be stored in a local memory on-board the UAV. The map may be stored on an external device, such as one or more servers, other UAVs, remote controller, visual display device, or a cloud computing infrastructure. In some embodiments, the map may be accessible on-board the local memory of the UAV. The UAV may be capable of accessing and/or adding to the map even if external communications or signals are not working.

Thus, a UAV may be capable of engaging in a visual navigation technique for performing an auto-return. The UAV may be capable of automatically returning to a starting point without requiring any manual control by the user. The UAV may or may not receive a user input to initiate the auto-return sequence. Once the auto-return sequence is initiated, no further input by the user may be provided or required to return the UAV to the starting point.

In some instances, a UAV may be operating within a relatively featureless environment. If the environment is relatively featureless, the UAV may rely on other navigational aids, such as GPS, IMU information, and/or information from any other sensors as described elsewhere herein. In some instances, if the UAV is unable to detect a familiar feature during a return path, the UAV may automatically hover or land. The UAV may send an alarm or alert to the user of the UAV. The UAV may or may not include last known UAV location information when sending the alarm or alert to the UAV. The UAV may emit a visual or audible alert that may allow the UAV to be readily detectable or identifiable by a user that is within a sensory range of the UAV.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
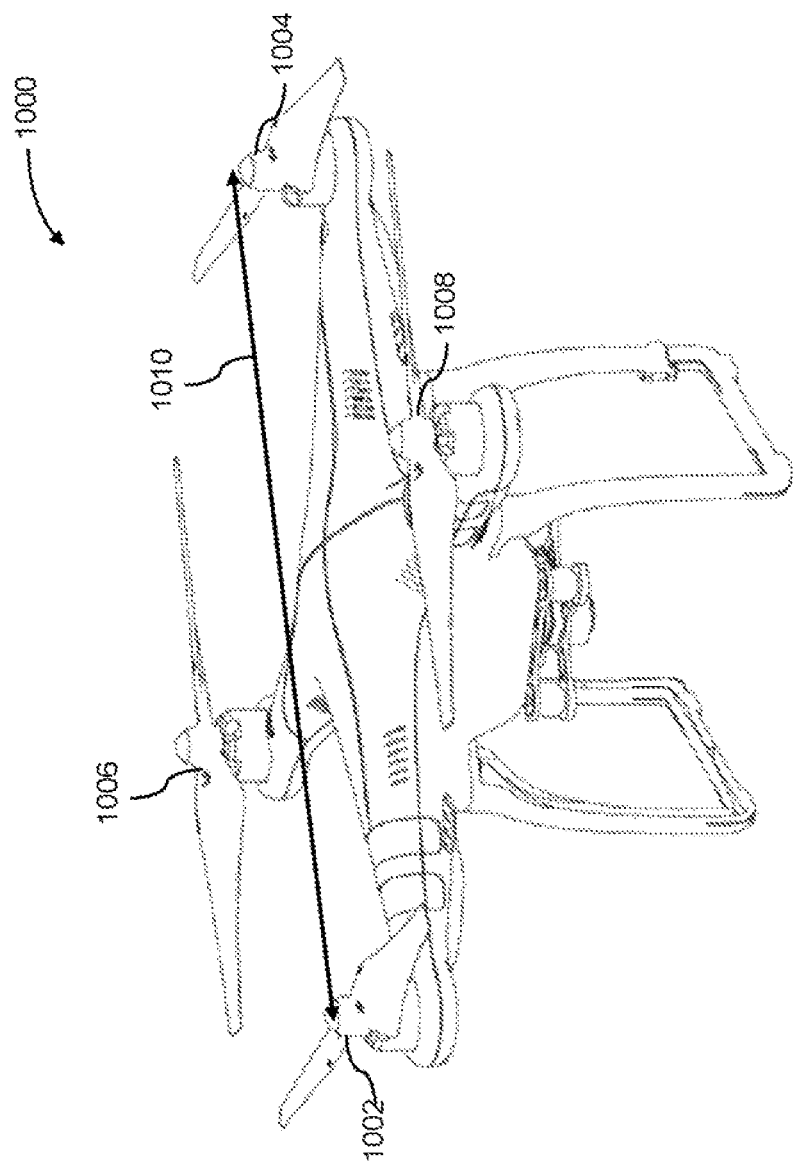
FIG. 10 illustrates an unmanned aerial vehicle (UAV), in accordance with an embodiment of the disclosure.

FIG. 10 illustrates an unmanned aerial vehicle (UAV) 1000, in accordance with embodiments of the disclosure. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 1 m, or less than equal to 5 m. In some embodiments, the length 1010 can be within a range from 1 cm to 7 m, from 70 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

The load can be provided in addition to or as an alternative to one or more image capture devices supported by the movable object. As previously described elsewhere herein, multiple image capture devices may be supported by the movable object. The image capture devices may be distributed over a body and/or arms of the movable object. The image capture devices may be arranged to have different orientations relative to one another. The image capture devices may be arranged so that portions of the movable object do not enter the field of view of the image capture devices. Alternatively one or more portions of the movable object may enter the field of view of the image capture devices.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
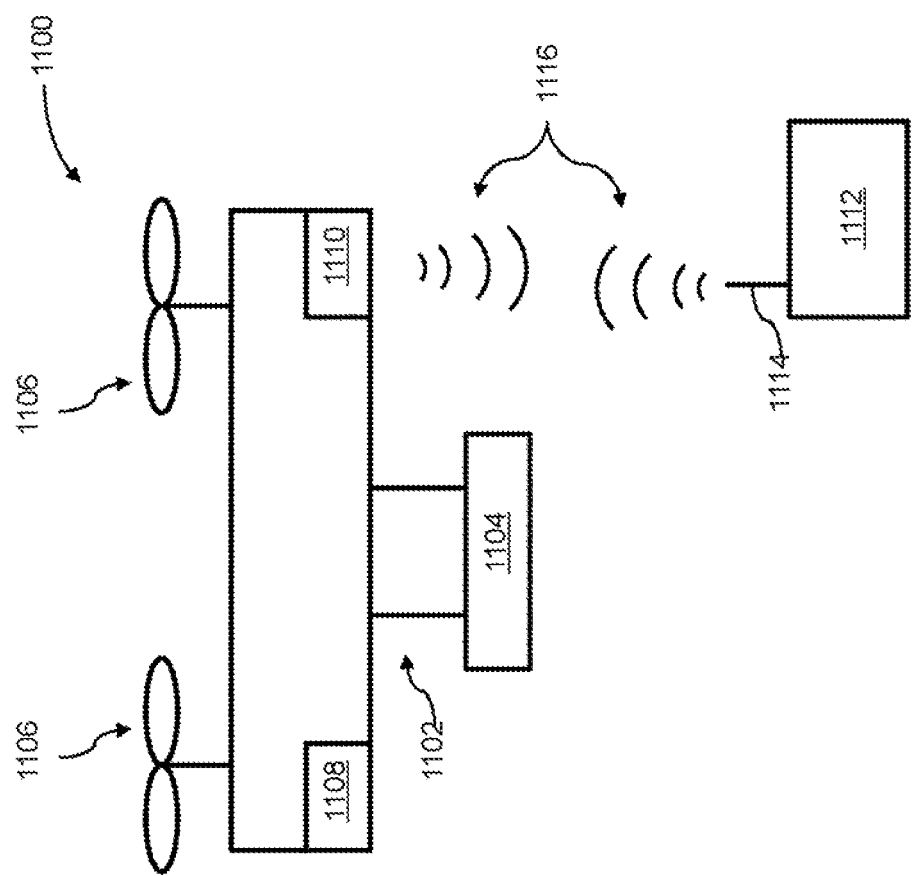
FIG. 11 illustrates a movable object including a carrier and a payload, in accordance with an embodiment of the disclosure.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1112.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
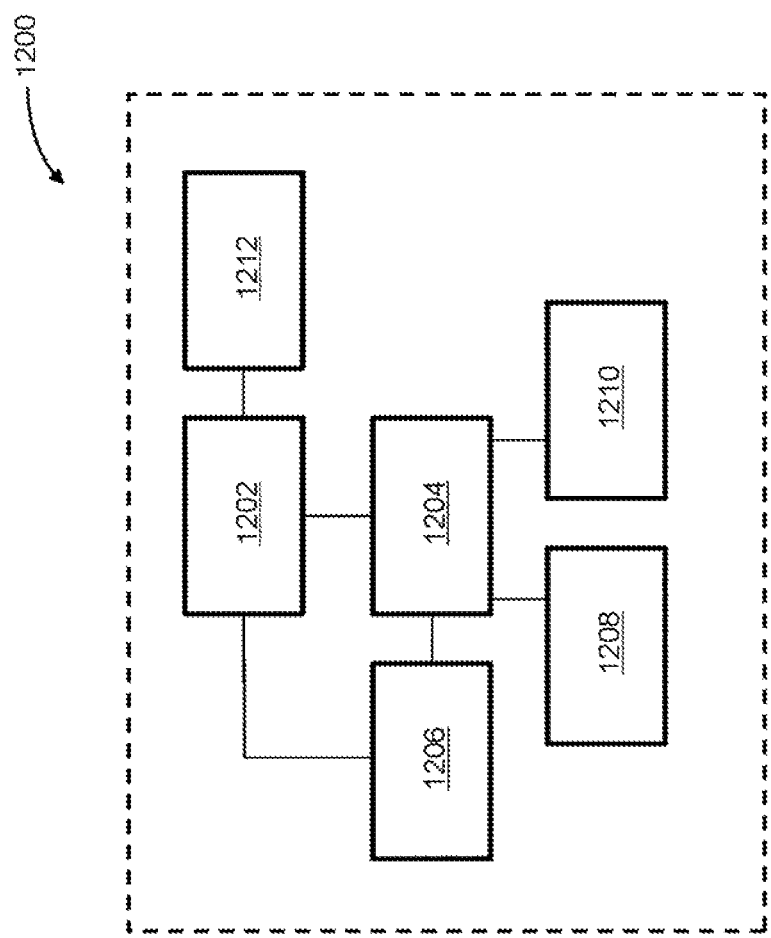
FIG. 12 is a schematic illustration by way of block diagram of a system for controlling a movable object, in accordance with an embodiment of the disclosure.

FIG. 12 is a schematic illustration by way of block diagram of a system 1200 for controlling a movable object, in accordance with embodiments. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An apparatus for controlling flight of an aerial vehicle, comprising:
   a memory storing a computer program code; and
   one or more processors, individually or collectively, configured to execute the computer program code to:
      collect, while the aerial vehicle traverses a flight path, a first set of images, the first set of images corresponding to different fields of view of an environment around the aerial vehicle;
      collect, while the aerial vehicle traverses a return path, a second set of images; and
      control the aerial vehicle to return along the return path based on the first set of images and the second set of images.

2. The apparatus of claim 1, wherein:
   the flight path starts at a starting location; and
   the flight path terminates at an end location, or the return path terminates at the starting location.

3. The apparatus of claim 1, wherein the one or more processors are further configured to execute the computer program code to:
   compare an image feature of the first set of images and an image feature of the second set of images, to control the aerial vehicle to traverse the return path.

4. The apparatus of claim 1, wherein the first set of images and the second set of images are obtained using multiple image capture devices, and the multiple image capture devices are arranged at different orientations relative to one another.

5. The apparatus of claim 1, wherein:
   the different fields of view span a 360° panoramic view around the aerial vehicle; or
   the different fields of view span a 360° vertical view around the aerial vehicle; or
   the different fields of view span a spherical space around the aerial vehicle; or
   each of the different fields of view is partially overlap with another adjacent field of view.

6. The apparatus of claim 4, wherein the one or more processors are further configured to execute the computer program code to control the multiple image capture devices to capture images of one or more visual landmarks when the aerial vehicle passes by the one or more visual landmarks while traversing the flight path.

7. The apparatus of claim 1, wherein the one or more processors are further configured to execute the computer program code to:

extract and store a first set of image features from the first set of images, the first set of image features being used for navigation of the aerial vehicle.

8. The apparatus of claim 7, wherein the one or more processors are further configured to execute the computer program code to construct a map of the first set of image features within the environment using the first set of image features.

9. The apparatus of claim 7, wherein the one or more processors are further configured to execute the computer program code to:
compare the first set of image features and a second set of image features extracted from the second set of images, to control the aerial vehicle to traverse the return path.

10. The apparatus of claim 1, wherein the flight path is a take-off path of the aerial vehicle, and the return path is a landing path of the aerial vehicle.

11. The apparatus of claim 1, wherein the return path follows the flight path in reverse.

12. The apparatus of claim 1, wherein the aerial vehicle is configured to have a first orientation when the aerial vehicle traverses the return path, and have a second orientation when the aerial vehicle traverses the flight path, the second orientation being different from the first orientation.

13. The apparatus of claim 1, wherein the one or more processors are further configured to execute the computer program code to:
construct a map of the environment using the first set of images.

14. The apparatus of claim 13, wherein the one or more processors are further configured to execute the computer program code to:
construct the map of the environment using the first set of images, and geo-spatial coordinate information or inertial measurement unit (IMU) information of the aerial vehicle.

15. The apparatus of claim 3, wherein the image feature includes at least one of a feature point, a descriptor, or a histogram.

16. A method of controlling flight of an aerial vehicle, comprising:
collecting, while the aerial vehicle traverses a flight path, a first set of images, the first set of images corresponding to different fields of view of an environment around the aerial vehicle;
collecting, while the aerial vehicle traverses a return path, a second set of images; and
controlling the aerial vehicle to return along the return path based on the first set of images and the second set of images.

17. The method of claim 16, wherein the flight path starts at a starting location and terminates at an end location.

18. The method of claim 17, wherein the return path starts at the end location and terminates at the starting location.

19. The method of claim 16, further comprising:
comparing the first set of images and the second set of images, to control the aerial vehicle to traverse the return path.

20. The method of claim 16, wherein the first set of images and the second set of images are obtained using multiple image capture devices, and the multiple image capture devices are arranged at different orientations relative to one another.

* * * * *